(12) United States Patent
Chen et al.

(10) Patent No.: US 12,195,017 B2
(45) Date of Patent: Jan. 14, 2025

(54) REDUNDANT ELECTRONIC CONTROL SYSTEM AND DEVICE

(71) Applicant: Huawei Technologies Co., Ltd., Shenzhen (CN)

(72) Inventors: Xuefeng Chen, Shenzhen (CN); Xin Huang, Shanghai (CN); Zhimin Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/990,003

(22) Filed: Nov. 18, 2022

(65) Prior Publication Data
US 2023/0356731 A1 Nov. 9, 2023

Related U.S. Application Data

(63) Continuation of application No. PCT/CN2020/091397, filed on May 20, 2020.

(51) Int. Cl.
B60W 50/023 (2012.01)
B60W 50/02 (2012.01)
B60W 50/029 (2012.01)

(52) U.S. Cl.
CPC ...... *B60W 50/023* (2013.01); *B60W 50/0225* (2013.01); *B60W 50/029* (2013.01); *B60W 2050/022* (2013.01); *B60W 2050/0292* (2013.01); *B60W 2050/0297* (2013.01)

(58) Field of Classification Search
CPC .......................... B60W 30/18; B60W 50/029
See application file for complete search history.

(56) References Cited

U.S. PATENT DOCUMENTS

| 6,301,133 | B1 | 10/2001 | Cuadra et al. |
| 2005/0159866 | A1 | 7/2005 | Takeuchi et al. |
| 2014/0172236 | A1 | 6/2014 | Nishikawa et al. |
| 2015/0042299 | A1 | 2/2015 | Li |

(Continued)

FOREIGN PATENT DOCUMENTS

| CN | 103401400 A | 11/2013 |
| CN | 104702125 A | 6/2015 |

(Continued)

OTHER PUBLICATIONS

Lv Xun-hong et al., "Research on architecture of fault tolerant flight control computer for UAVs," Nov. 2016, with an English abstract, 12 pages.

*Primary Examiner* — Jess Whittington
(74) *Attorney, Agent, or Firm* — Conley Rose, P.C.

(57) ABSTRACT

A redundant electronic control system includes a control unit, a first output component, and a second output component. The control unit may generate a first execution signal and a second execution signal. The control unit controls the first output component to output the first execution signal to a first actuator, and controls the second output component to output the second execution signal to a second actuator. When the first output component fails, the control unit may control the second output component to output the first execution signal to the first actuator. When the second output component fails, the control unit may control the first output component to output the second execution signal to the second actuator.

20 Claims, 7 Drawing Sheets

(56) References Cited

U.S. PATENT DOCUMENTS

| | | | |
|---|---|---|---|
| 2016/0250944 A1* | 9/2016 | Christ | B60L 58/15 |
| | | | 701/22 |
| 2016/0268914 A1 | 9/2016 | Lee et al. | |
| 2017/0217481 A1 | 8/2017 | Asao et al. | |
| 2017/0237377 A1 | 8/2017 | Furukawa et al. | |
| 2018/0257662 A1 | 9/2018 | Ishigooka et al. | |
| 2019/0079513 A1 | 3/2019 | Greenfield et al. | |
| 2019/0100237 A1 | 4/2019 | Klesing | |
| 2019/0184922 A1 | 6/2019 | Tazarine et al. | |
| 2019/0300046 A1 | 10/2019 | Hirayama et al. | |
| 2019/0308657 A1 | 10/2019 | Uryu et al. | |
| 2020/0010094 A1 | 1/2020 | Nakada | |
| 2020/0059189 A1 | 2/2020 | Ohashi | |
| 2020/0091853 A1 | 3/2020 | Yoshida et al. | |
| 2020/0148218 A1* | 5/2020 | Huang | G06F 11/165 |

FOREIGN PATENT DOCUMENTS

| | | |
|---|---|---|
| CN | 104777745 A | 7/2015 |
| CN | 106054868 A | 10/2016 |
| CN | 106712613 A | 5/2017 |
| CN | 106945720 A | 7/2017 |
| CN | 107074268 A | 8/2017 |
| CN | 107288770 A | 10/2017 |
| CN | 107343389 A | 11/2017 |
| CN | 108137055 A | 6/2018 |
| CN | 109314480 A | 2/2019 |
| CN | 109314483 A | 2/2019 |
| CN | 109606465 A | 4/2019 |
| CN | 109677468 A | 4/2019 |
| CN | 109917779 A | 6/2019 |
| CN | 110235358 A | 9/2019 |
| CN | 110435569 A | 11/2019 |
| CN | 110463025 A | 11/2019 |
| CN | 110654239 A | 1/2020 |
| CN | 110962815 A | 4/2020 |
| CN | 109685858 B | 12/2020 |
| CN | 108932737 B | 2/2021 |
| DE | 102011117116 A1 | 5/2013 |
| EP | 3264591 A1 | 1/2018 |
| EP | 3626554 A1 | 3/2020 |
| JP | 3839358 B2 | 11/2006 |
| JP | 2020048310 A | 3/2020 |

* cited by examiner

REDUNDANT ELECTRONIC CONTROL SYSTEM AND DEVICE

CROSS-REFERENCE TO RELATED APPLICATIONS

This is a continuation of International Patent Application No. PCT/CN2020/091397 filed on May 20, 2020, which is hereby incorporated by reference in its entirety.

TECHNICAL FIELD

This application relates to the field of electronic control system technologies, furthermore, to a redundant electronic control system and a device.

BACKGROUND

In a conventional vehicle, a mechanical control system is usually used to control a driving status of the vehicle. However, with development of vehicle technologies of autonomous vehicles, intelligent connected vehicles, new energy vehicles, and the like, the mechanical control system cannot adapt to vehicle performance improvements brought by new technologies. Under such circumstances, more and more vehicles use electronic control systems to replace mechanical control systems to control actuators (such as motors and electrohydraulic valves) in them. Compared with the mechanical control system, the electronic control system can implement many advantages such as more refined control, a higher response speed, and lower production costs, and therefore can enhance vehicle performance improvement potential and help implement autonomous driving.

However, in terms of safety and stability, compared with the mechanical system (a failure of a mechanical component has a gradual accumulation process), a failure of the electronic control system usually occurs suddenly. Therefore, a high level requirement is needed to the safety and stability of the electronic control system. In view of this, the electronic control system usually has a redundant design. Given an exemplification of an electric vehicle, which has two identical electronic control systems, i.e., system 1 and a system 2. The system 1 may provide electric energy for a motor 1, and the system 2 may provide electric energy for a motor 2. The motor 1 and the motor 2 may separately convert received electric energy into mechanical energy, combine the mechanical energy, and output the mechanical energy to a propulsion system of the vehicle, to drive the vehicle to change a motion status.

However, a current redundant system usually performs only simple system backup. In case any one of the systems fails, stability of total output power of a plurality of actuators usually cannot be ensured. In the above example, when the system 2 fails, the motor 2 cannot work, and only the motor 1 can provide mechanical energy for a drive system of the vehicle. Therefore, the vehicle cannot correctly change the motion status, which may have an adverse impact on personal or property safety.

It can be learned that the safety and stability of the electronic control system still need to be further improved.

SUMMARY

This application provides a redundant electronic control system and a device such that actuators controlled by the redundant electronic control system can keep stable outputs in different fault scenarios, thereby helping improve stability and safety of the electronic control system.

According to a first aspect, an embodiment of this application provides a redundant electronic control system, mainly including a control unit, a first output component, and a second output component. The control unit is separately connected to a control end of the first output component and a control end of the second output component. A first output end of the first output component may be connected to a first actuator, a second output end of the first output component may be connected to a second actuator, a first output end of the second output component may be connected to the first actuator, and a second output end of the second output component may be connected to the second actuator. On this basis, the control unit may generate a first execution signal and a second execution signal. The control unit controls the first output component to output the first execution signal to the first actuator, and controls the second output component to output the second execution signal to the second actuator. When the first output component fails, the control unit may control the second output component to output the first execution signal to the first actuator. When the second output component fails, the control unit may control the first output component to output the second execution signal to the second actuator.

For example, in this embodiment of this application, the first actuator and the second actuator may be redundant actuators. The first actuator may output first energy to an output target based on the first execution signal, and the second actuator may output second energy to the output target based on the second execution signal.

In the redundant electronic control system provided in this embodiment of this application, there are redundant output components, namely, the first output component and the second output component, and the first output component and the second output component can implement cross output. When any one of the output components (the first output component or the second output component) fails, the redundant electronic control system can still provide the first execution signal for the first actuator, and provide the second execution signal for the second actuator such that the first actuator and the second actuator can keep working, and the first energy output by the first actuator and the second energy output by the second actuator can still be combined and provided to the output target, to enable the output target to work stably. This helps improve stability and safety of the redundant electronic control system.

In this embodiment of this application, a redundancy design may be performed on the control unit. For example, the control unit may include a first control component and a second control component. The first control component is connected to the first output component, and the second control component is connected to the second output component. The first control component may generate the first execution signal, and control the first output component to output the first execution signal to the first actuator. When the second output component fails, the first control component may further control the first output component to output the second execution signal to the second actuator. The second control component may generate the second execution signal, and control the second output component to output the second execution signal to the second actuator. When the first output component fails, the second control component may further control the second output component to output the first execution signal to the first actuator.

The first control component and the second control component are redundant in the control unit. This helps further improve the stability and the safety of the redundant electronic control system.

For example, the first output component provided in this embodiment of this application may include a first switch unit and a second switch unit. An input end of the first switch unit and an input end of the second switch unit are separately connected to the first control component. An output end of the first switch unit is connected to the first actuator, and an output end of the second switch unit is connected to the second actuator. The first control component is separately connected to a control end of the first switch unit and a control end of the second switch unit. In this case, the first control component may switch on the first switch unit such that the first execution signal is output to the first actuator through the first switch unit. When the second output component fails, the first control component may switch on the second switch unit such that the second execution signal is output to the second actuator through the second switch unit.

In this embodiment of this application, the first control component may generate the first execution signal. For example, the first control component may include a first control circuit, a first power switch, and a first power converter. An input end of the first power switch is configured to receive a first power signal, an output end of the first power switch is connected to an input end of the first power converter, an output end of the first power converter is connected to the first output component, and the first control circuit is separately connected to a control end of the first power switch and a control end of the first power converter. In this case, the first control circuit may control the first power switch to switch on a transmission path from the first power signal to the first power converter. The first control circuit controls, based on a first execution target of the first actuator, the first power converter to convert the first power signal into the first execution signal, where the first execution signal may drive the first actuator to execute the first execution target. Then, the first control circuit switches on the first switch unit such that the first execution signal is output to the first actuator through the first switch unit.

For example, in the redundant electronic control system provided in this embodiment of this application, when the first control circuit fails, the first execution signal and the second execution signal may still be output. The second control component is further connected to the control end of the first switch unit, the control end of the first power converter, and the control end of the first power switch. When the first control circuit fails, the second control component may further control the first power switch to switch on the transmission path from the first power signal to the first power converter. The second control component controls, based on a first execution target of the first output component, the first power converter to convert the first power signal into the first execution signal. The second control component switches on the first switch unit, and the first execution signal is output to the first actuator through the first switch unit.

In this implementation, even if the first control component fails, the redundant electronic control system can still output the first execution signal to the first actuator. This helps further improve the safety and stability of the redundant electronic control system.

In the redundant electronic control system provided in this embodiment of this application, when the first power switch or the first power converter fails, the first execution signal and the second execution signal may still be output. For example, the second control component may further generate the first execution signal and the second execution signal when the first power switch or the first power converter fails. The second control component controls the second output component to output the first execution signal to the first actuator and output the second execution signal to the second actuator.

In the redundant electronic control system provided in this embodiment of this application, when the second output component fails, the first execution signal and the second execution signal may still be output. In a possible implementation, when the second output component fails, the first control circuit may further control, based on the first execution target of the first actuator and a second execution target of the second actuator, the first power converter to convert the first power signal into a combined signal, where a part of the combined signal is provided for the first switch unit as the first execution signal, and another part of the combined signal is provided for the second switch unit as the second execution signal. The first control circuit switches on the first switch unit, and the first execution signal is output to the first actuator through the first switch unit, and switches on the second switch unit, and the second execution signal is output to the second actuator through the second switch unit.

In this case, the first actuator and the second actuator may be actuators that meet a synchronization relationship. In other words, the first actuator and the second actuator are actuators having a same input/output conversion relationship, the first execution signal and the second execution signal are synchronized, and output energy of the first actuator and output energy of the second actuator also change synchronously. For example, the first actuator and the second actuator may be brushed direct current motors. For another example, the first actuator and the second actuator may be brushless direct current motors or permanent-magnet synchronous motors, and the first actuator and the second actuator have a same output shaft. For another example, the first actuator and the second actuator may be brushless direct current motors or permanent-magnet synchronous motors, and the first actuator and the second actuator have a same gear reduction ratio when combining outputs.

In another possible implementation, the first control component may further include a second power switch and a second power converter. An input end of the second power switch is configured to receive the first power signal, an output end of the second power switch is connected to an input end of the second power converter, an output end of the second power converter is connected to the first output component, and the first control circuit is separately connected to a control end of the second power switch and a control end of the second power converter. When the second output component fails, the first control circuit may further control the second power switch on a transmission path from the first power signal to the second power converter. The first control circuit controls, based on a second execution target of the second actuator, the second power converter to convert the first power signal into the second execution signal. The first control circuit switches on the second switch unit, and the second execution signal is output to the second actuator through the second switch unit.

In this implementation, the first actuator and the second actuator may be actuators that meet a synchronization relationship, or may be actuators that do not meet a synchronization relationship. This helps further expand an application scope of an actuator.

To further improve the safety and stability of the redundant electronic control system, the control end of the second switch unit in the first output component may be further connected to the second output end of the second output component, and the second switch unit may be further switched off when the second execution signal is received.

In this implementation, the second switch unit can be prevented from false conduction during normal output of the second output component, thereby helping improve the safety and stability of the redundant electronic control system.

Similar to the first output component, the second output component may include a third switch unit and a fourth switch unit. An input end of the third switch unit and an input end of the fourth switch unit are separately connected to the second control component, an output end of the third switch unit is connected to the first actuator, an output end of the fourth switch unit is connected to the second actuator, and the second control component is separately connected to a control end of the third switch unit and a control end of the fourth switch unit. In this case, the second control component may switch on the fourth switch unit such that the second execution signal is output to the second actuator through the fourth switch unit. The second control component may further switch on the third switch unit when the first output component fails such that the first execution signal is transmitted to the first actuator through the third switch unit.

The second control component may generate the second execution signal. For example, the second control component includes a second control circuit, a third power switch, and a third power converter. An input end of the third power switch is configured to receive a second power signal, an output end of the third power switch is connected to an input end of the third power converter, and a control end of the third power switch is connected to the second control circuit. An output end of the third power converter is connected to the second output component, and a control end of the third power converter is connected to the second control circuit. In this case, the second control circuit may control the third power switch to switch on a transmission path from the second power signal to the third power converter. The second control circuit controls, based on the second execution target of the second actuator, the third power converter to convert the second power signal into the second execution signal, where the second execution signal is used to drive the second actuator to execute the second execution target. The second control circuit switches on the fourth switch unit, and the second execution signal is output to the second actuator through the fourth switch unit.

In the redundant electronic control system provided in this embodiment of this application, when the second control circuit fails, the first execution signal and the second execution signal may still be output. For example, the first control component is further connected to the control end of the fourth switch unit, the control end of the third power converter, and the control end of the third power switch. When the second control circuit fails, the first control component may further control the third power switch to switch on the transmission path from the second power signal to the third power converter; the first control component controls, based on the second execution target of the second output component, the third power converter to convert the second power signal into the second execution signal; and the first control component switches on the fourth switch unit, and the second execution signal is output to the second actuator through the fourth switch unit.

In the redundant electronic control system provided in this embodiment of this application, when the third power switch and/or the third power converter fails, the first execution signal and the second execution signal may still be output. For example, when the third power switch and/or the third power converter fails, the first control component may further generate the first execution signal and the second execution signal; and the first control component controls the first output component to output the second execution signal to the second actuator, and output the first execution signal to the first actuator.

In the redundant electronic control system provided in this embodiment of this application, when the first output component fails, the first execution signal and the second execution signal may still be output. When the first output component fails, the second control circuit may further control, based on the first execution target of the first actuator and the second execution target of the second actuator, the third power converter to convert the second power signal into a combined signal, where a part of the combined signal is provided for the third switch unit as the first execution signal, and another part of the combined signal is provided for the fourth switch unit as the second execution signal; the second control circuit switches on the fourth switch unit such that the second execution signal is output to the second actuator through the fourth switch unit; and the second control circuit switches on the third switch unit such that the first execution signal is output to the first actuator through the third switch unit.

In this implementation, a synchronization relationship needs to be met between the first actuator and the second actuator. Details are not described again.

In another possible implementation, the second control component may further include a fourth power switch and a fourth power converter. An input end of the fourth power switch is configured to receive the second power signal, an output end of the fourth power switch is connected to an input end of the fourth power converter, and a control end of the fourth power switch is connected to the second control circuit. An output end of the fourth power converter is connected to the second output component, and a control end of the fourth power converter is connected to the second control circuit. When the first output component fails, the second control circuit may further control the fourth power switch to switch on a transmission path from the second power signal to the fourth power converter; the second control circuit controls, based on the first execution target of the first actuator, the fourth power converter to convert the second power signal into the first execution signal; and the second control circuit switches on the third switch unit, and the first execution signal is output to the first actuator through the third switch unit.

In this implementation, the synchronization relationship may be or may not be met between the first actuator and the second actuator.

To further improve the safety and stability of the redundant electronic control system, in the second output component provided in this embodiment of this application, the control end of the third switch unit may be further connected to the first output end of the first output component, and the third switch unit may be further switched off when the first execution signal is received.

According to a second aspect, an embodiment of this application provides a redundant electronic control system.

For some technical effects in the second aspect, refer to technical effects that can be obtained by using a corresponding solution in the first aspect. No repeated description is provided. For example, the redundant electronic control system provided in this embodiment of this application mainly includes a first input component, a second input component, a first control component, and an output unit. The first input component and the second input component are separately connected to the first control component, the first control component is connected to the output unit, and the output unit is configured to connect to a first actuator; the first input component may obtain first input information, and output the first input information to the first control component; and the second input component may obtain second input information, and when the first input component fails, output the second input information to the first control component. The first control component may generate a first execution signal based on the first input information or the second input information; and then the first control component may control the output unit to output the first execution signal to the first actuator.

In this implementation, the redundant electronic control system includes redundant input components. In this way, even if one of the input components fails, the other input component can still provide input information for the first control component, thereby helping improve stability and safety of the redundant electronic control system.

The redundant electronic control system provided in this embodiment of this application may further include a redundant control component. For example, the redundant electronic control system further includes a second control component, and the output unit may be further connected to a second actuator. In this case, the second input component may further output the second input information to the second control component; the first input component may further output the first input information to the second control component; the second control component may generate a second execution signal based on the first input information or the second input information; and then the second control component may control the output unit to output the second execution signal to the second actuator.

The input components provided in this embodiment of this application have a plurality of possible implementations. For example, the first input component includes a first communications component, the second input component includes a second communications component, and both the first input information and the second input information include control information. In this case, the first communications component may receive the control information and send the control information to the first control component, and the second communications component may receive the control information and send the control information to the second control component. The first communications component may further send the control information to the second control component when the second communications component fails; and/or the second communications component may further send the control information to the first control component when the first communications component fails.

In this implementation, even if any one of the first communications component and the second communications component fails, the first control component and the second control component can still obtain the control information by using the other communications component. Therefore, this helps further improve the safety and stability of the redundant electronic control system.

For another example, the first input component includes a first sensor component, the second input component includes a second sensor component, the first input information includes first sensing information, and the second input information includes second sensing information. In this case, the first sensor component may generate the first sensing information, and output the first sensing information to the first control component; the second sensor component may generate the second sensing information, and output the second sensing information to the second control component; the first sensor component may further output the first sensing information to the second control component when the second sensor component fails; and/or the second sensor component may further send the second sensing information to the first control component when the first sensor component fails.

In this implementation, even if any one of the first sensor component and the second sensor component fails, the first control component and the second control component can still obtain the sensing information by using the other sensor component. Therefore, this helps further improve the safety and stability of the redundant electronic control system.

In this embodiment of this application, the first control component is connected to the second control component; the first control component may further output the first input information to the second control component when the second input component fails; the second control component may further generate the second execution signal based on the first input information; and/or the second control component may further output the second input information to the first control component when the first input component fails; and the first control component may further generate the first execution signal based on the second input information.

In this implementation, a manner in which the first control component and the second control component obtain the input information is added. This helps further improve the safety and stability of the redundant electronic control system.

For example, the first input component includes a first communications component, the second input component includes a second communications component, and both the first input information and the second input information include control information; the first communications component may receive the control information, and send the control information to the first control component such that the first control component can generate the first execution signal based on the control information provided by the first communications component; the second communications component may receive the control information, and send the control information to the second control component such that the second control component can generate the second execution signal based on the control information provided by the second communications component; the first control component may further send the control information to the second control component when the second communications component fails such that the second control component can generate the second execution signal based on the control information sent by the first control component; and/or the second control component may further send the control information to the first control component when the first communications component fails such that the first control component can generate the first execution signal based on the control information sent by the second control component.

In this implementation, when the first communications component fails, the first control component can still generate the first execution signal, and when the second communications component fails, the second control component can still generate the second execution signal such that the first actuator and the second actuator can continuously work. This helps improve the safety and stability of the redundant electronic control system.

For another example, the first input component includes a first sensor component, the second input component includes a second sensor component, the first input information includes first sensing information, and the second input information includes second sensing information; the first sensor component may generate the first sensing information, and output the first sensing information to the first control component such that the first control component can generate the first execution signal based on the first sensing information provided by the first sensor component; the second sensor component may generate the second sensing information, and output the second sensing information to the second control component such that the second control component can generate the second execution signal based on the second sensing information provided by the second sensor component; the first control component may further send the first sensing information to the second control component when the second sensor component fails such that the second control component can generate the second execution signal based on the first sensing information sent by the first control component; and/or the second control component may further send the second sensing information to the first control component when the first sensor component fails such that the first control component can generate the first execution signal based on the second sensing information sent by the second control component.

In this implementation, when the first sensor component fails, the first control component can still generate the first execution signal, and when the second sensor component fails, the second control component can still generate the second execution signal such that the first actuator and the second actuator can continuously work. This helps improve the safety and stability of the redundant electronic control system.

This embodiment of this application further provides a manner of detecting whether a sensor component fails. For example, the first control component may further monitor the second sensing information, and the first control component detects, based on the first sensing information and the second sensing information, whether the first sensor component and the second sensor component fail; and when determining that the first sensor component or the second sensor component fails, the first control component may send first detection information to the second control component, where the first detection information may indicate the second sensor component to detect whether the first sensor component and the second sensor component fail.

The first control component monitors the second sensing information, and verifies, by using the monitored second sensing information and the received first sensing information, whether the first sensor component and the second sensor component fail. This helps improve diagnosis coverage of a safety mechanism of detecting a first sensing signal and a second sensing signal by the redundant electronic control system. In the meantime, the first control component monitors only the second sensor component such that interference to the second sensing signal can be avoided.

For example, the first sensing information includes first sensing verification information and second sensing verification information, and the first control component may detect, based on consistency between the first sensing verification information and the second sensing verification information, whether the first sensor component fails. After determining that the first sensor component does not fail, the first control component detects, based consistency between the first sensing information and second sensing information, whether the second sensor component fails.

The first sensing verification information and the second sensing verification information may be carried in different sensing signals. When the first sensor component works normally, the first sensing verification information and the second sensing verification information need to be same sensing information. When both the first sensor component and the second sensor component work normally, same sensing information may be generated. Therefore, whether the first sensor component and the second sensor component fail may be further detected based on the consistency between the first sensing information and the second sensing information.

In this embodiment of this application, the first control component and the second control component may be powered by different power supply components. For example, the redundant electronic control system further includes a first power supply component and a second power supply component. The first power supply component and the second power supply component are respectively connected to the first control component and the second control component. In this case, the first power supply component and the second power supply component may output the first power signal to the first control component in parallel, and output the second power signal to the second control component in parallel.

According to a third aspect, an embodiment of this application provides a redundant electronic control system. For some technical effects in the third aspect, refer to technical effects that can be obtained by using a corresponding solution in the first aspect or in the second aspect. No repeated description is provided. For example, the redundant electronic control system provided in this embodiment of this application mainly includes a first control component, a second control component, and an output unit. The output unit is separately connected to the first control component and the second control component, and the output unit is separately connected to a first actuator and a second actuator. The first control component may generate a first execution signal, and control the output unit to output the first execution signal to the first actuator; the second control component may generate a second execution signal, and control the output unit to output the second execution signal to the second actuator; when the second control component fails, the first control component may further control the output unit to output the second execution signal to the second actuator; and/or when the first control component fails, the second control component may further control the output unit to output the first execution signal to the first actuator.

In this implementation, even if any one of the first control component and the second control component fails, the redundant electronic control system can still output the first execution signal to the first actuator and output the second execution signal to the second actuator such that the first actuator and the second actuator can continuously work. This helps improve safety and stability of the redundant electronic control system.

For example, the first control component includes a first control circuit, a first power switch, and a first power converter. An input end of the first power switch is configured to receive a first power signal, an output end of the first power switch is connected to an input end of the first power converter, and a control end of the first power switch is connected to the first control circuit. An output end of the first power converter is connected to the output unit, and a control end of the first power converter is connected to the first control circuit. The first control circuit is connected to the output unit; and the first power signal may supply power to the first control component. In this case, the first control circuit may control the first power switch to switch on a transmission path from the first power signal to the first power converter; the first control circuit controls, based on a first execution target of the first actuator, the first power converter to convert the first power signal into the first execution signal; and the first control circuit controls the output unit to output the first execution signal to the first actuator.

Based on the foregoing implementation of the first control component, that the first control component fails includes that the first control circuit fails. When the first control circuit fails, the second control component may control the first power switch to switch on the transmission path from the first power signal to the first power converter; the second control component may control, based on the first execution target of the first actuator, the first power converter to convert the first power signal into the first execution signal; and then, the second control component may control the output unit to output the first execution signal to the first actuator.

Based on the foregoing implementation of the first control component, that the first control component fails may further include that the first power switch and/or the first power converter fails. When the first power switch and/or the first power converter fails, the second control component may generate the first execution signal and the second execution signal; and then, the second control component may control the output unit to output the first execution signal to the first actuator, and output the second execution signal to the second actuator.

For example, the second control component includes a second control circuit, a third power switch, and a third power converter. An input end of the third power switch is configured to receive a second power signal, an output end of the third power switch is connected to an input end of the third power converter, and a control end of the third power switch is connected to the second control circuit. An output end of the third power converter is connected to the output unit, and a control end of the third power converter is connected to the second control circuit. The second control circuit is connected to the output unit. In this case, the second control circuit may control the third power switch to switch on a transmission path from the second power signal to the third power converter; the second control circuit controls, based on a second execution target of the second actuator, the third power converter to convert the second power signal into the second execution signal; and then, the second control circuit may control the output unit to output the second execution signal to the second actuator.

In a possible implementation, when the first power switch and/or the first power converter fails, the second control circuit may further control, based on the first execution target of the first actuator and the second execution target of the second actuator, the third power converter to convert the second power signal into a combined signal; and then, the second control circuit may control the output unit to output a part of the combined signal to the first actuator as the first execution signal, and indicate another part of the combined signal to the second actuator as the second execution signal.

In a possible implementation, the second control component further includes a fourth power switch and a fourth power converter. An input end of the fourth power switch is configured to receive the second power signal, an output end of the fourth power switch is connected to an input end of the fourth power converter, and a control end of the fourth power switch is connected to the second control circuit. An output end of the fourth power converter is connected to the output unit, and a control end of the fourth power converter is connected to the second control circuit. When the first power switch and/or the first power converter fails, the second control circuit may further control the fourth power switch to switch on a transmission path from the second power signal to the fourth power converter; the second control circuit controls, based on the first execution target of the first actuator, the fourth power converter to convert the second power signal into the first execution signal; and then, the second control circuit may control the output unit to output the first execution signal to the first actuator.

Based on the foregoing implementation of the second control component, that the second control component fails includes that the second control circuit fails, and the first control circuit is further separately connected to the control end of the third power switch and the control end of the third power converter. When the second control circuit fails, the first control circuit may further control the third power switch to switch on the transmission path from the second power signal to the third power converter; the first control circuit controls, based on the second execution target of the second actuator, the third power converter to convert the second power signal into the second execution signal; and then, the first control circuit may control the output unit to output the second execution signal to the second actuator.

Based on the foregoing implementation of the second control component, that the second control component fails may further include that the third power switch and/or the third power converter fails. When the third power switch and/or the third power converter fails, the first control component may generate the first execution signal and the second execution signal; and then, the first control component may control the output unit to output the first execution signal to the first actuator, and output the second execution signal to the second actuator.

In a possible implementation, when the third power converter and/or the third power switch fails, the first control circuit may further control, based on the first execution target of the first actuator and the second execution target of the second actuator, the first power converter to convert the first power signal into a combined signal; and then, the first control circuit may control the output unit to output a part of the combined signal to the first actuator as the first execution signal, and indicate another part of the combined signal to the second actuator as the second execution signal.

In another possible implementation, the first control component further includes a second power switch and a second power converter. An input end of the second power switch is configured to receive the first power signal, an output end of the second power switch is connected to an input end of the second power converter, an output end of the second power converter is connected to the first output component, and the first control circuit is separately connected to a control end of the second power switch and a control end of the second power converter. When the third power converter and/or the third power switch fails, the first control circuit may further control the second power switch to switch on a transmission path from the first power signal to the second power converter; the first control circuit controls, based on the second execution target of the second actuator, the second power converter to convert the first power signal into the second execution signal; and then, the first control circuit may control the output unit to output the second execution signal to the second actuator.

According to a fourth aspect, an embodiment of this application provides a device. The device mainly includes a first actuator, a second actuator, and the redundant electronic control system provided in any one of the first aspect to the third aspect. For technical effects of a corresponding solution in the fourth aspect, refer to technical effects that can be obtained by using corresponding solutions in the first aspect to the third aspect. No repeated description is provided. In the device provided in this embodiment of this application, the redundant electronic control system may output a first execution signal to the first actuator, and output a second execution signal to the second actuator. The first actuator may run under driving of the first execution signal. The second actuator may run under driving of the second execution signal.

For example, the device provided in this embodiment of this application may be a device, for example, an autonomous vehicle, an artificial heart, or a flight vehicle, that can be compatible with an electronic control system.

These aspects or other aspects of this application are clearer and more comprehensible in descriptions of the following embodiments.

DESCRIPTION OF EMBODIMENTS

With development of electronic technologies and power devices, electronic control systems have replaced conventional mechanical control systems in many fields. For example, more vehicles use electronic control systems. Compared with the mechanical control system, the electronic control system can implement many advantages such as more refined control, a higher response speed, and lower production costs, and therefore can enhance vehicle performance improvement potential and help implement autonomous driving.

The electronic control system, which may also be referred to as an electron transfer system, a wire-controlled system, or the like, may be mainly implemented by using a microcontroller unit (MCU) on which a corresponding program is stored and a power device, and may control an actuator in a device. Generally, the electronic control system has a significant application value in an autonomous vehicle. Therefore, the following describes the embodiments of this application by using the autonomous vehicle as an example.

Figure 1:
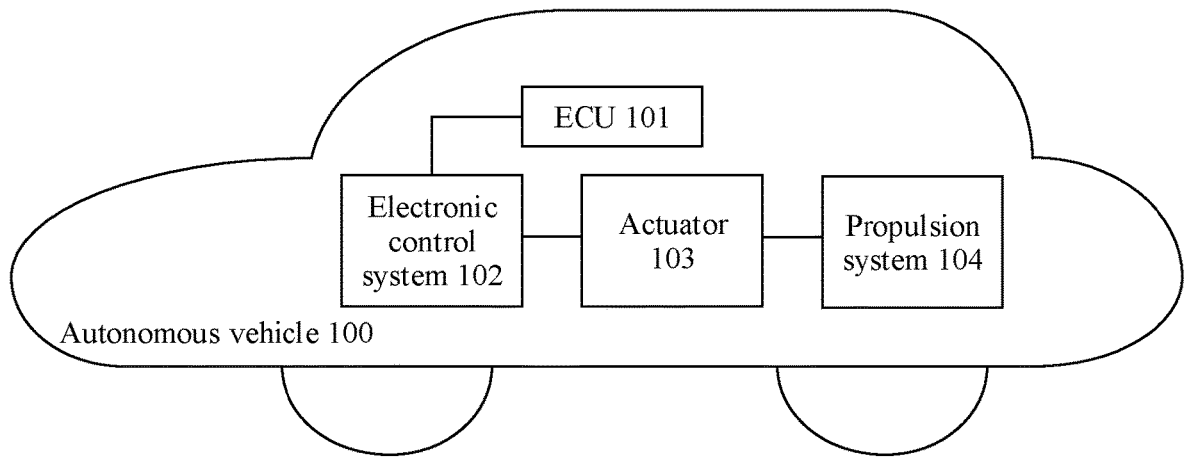
FIG. 1 is a schematic structural diagram of an autonomous vehicle.

For example, FIG. 1 is a schematic structural diagram of an autonomous vehicle. The autonomous vehicle 100 includes an electronic control unit (ECU) 101, an electronic control system 102, an actuator 103, and a propulsion system 104.

The ECU 101 may send control information to the electronic control system 102 according to a driving instruction from a user, or by running an autonomous driving algorithm, or the like. The electronic control system 102 may control an output power of the actuator 103 based on the control information, to change a driving status of the autonomous vehicle 100.

Generally, actuators 103 of different function types correspond to different electronic control systems 102. For example, when the actuator 103 is a motor, the electronic control system 102 may be an electric power steering (EPS) control system or an electric mechanical brake (EMB) control system. The ECU 101 may send the control information to the electronic control system 102 to indicate the electronic control system 102 to increase an output torque of the actuator 103, thereby driving the autonomous vehicle 100 to steer or brake.

For another example, when the actuator 103 is an electrohydraulic valve, the electronic control system 102 may be an electronic hydraulic brake system (EHB). The ECU 101 may send the control information to the electronic control system 102 to indicate the electronic control system 102 to increase an output liquid pressure of the actuator 103, thereby controlling the autonomous vehicle 100 to brake.

However, compared with a conventional mechanical control system, the electronic control system 102 has many advantages, but a higher requirement on stability and safety of the electronic control system 102 is imposed while the electronic control system 102 improves performance of the autonomous vehicle 100.

In some embodiments, a failure of a mechanical component in the mechanical control system is mainly caused by mechanical factors such as abrasion and mechanical damage. That is, the failure of the mechanical component has a gradual accumulation process. However, because there is a large quantity of internal electronic components in the electronic control system 102, and a failure of an electronic component usually has no precursor, the failure is usually occurred suddenly with unpredictable consequences.

In some devices with the electronic control system, failures of some functions may cause serious consequences such as personal injuries. Therefore, the design of such devices needs to meet functional safety requirements of a certain level. For example, the electronic control system may include power systems and steering systems of electric-driven aircrafts, vehicles, airborne vehicles, and drone, power systems and braking systems in rail transportation, propulsion systems, steering systems, and braking systems of high-grade unmanned vehicles; power systems in medical electronic products such as heart pacemakers and artificial hearts, and the like. In these fields, safety and stability of the electronic control system are directly related to personal and property safety of a user.

The safety of the electronic control system may be understood as a capability of the electronic control system in ensuring the personal and property safety of the user. The stability of the electronic control system may be understood as a capability of the electronic control system in ensuring safety in cases of different types of faults.

Figure 2:
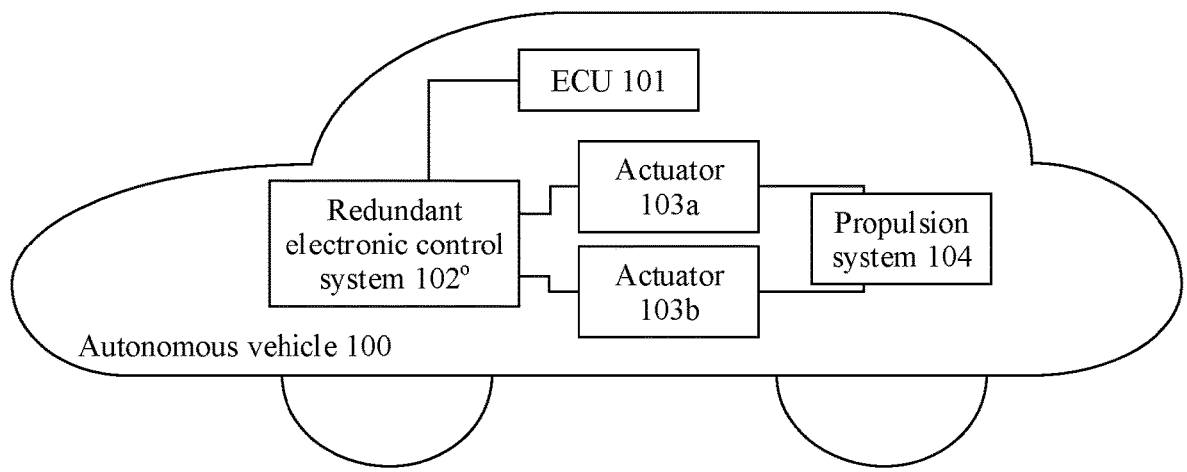
FIG. 2 is a schematic structural diagram of an autonomous vehicle using a redundant electronic control system.

To improve the stability and safety of the electronic control system, a redundancy design may be performed on the electronic control system. In this case, the electronic control system may also be referred to as a redundant electronic control system. As shown in FIG. 2, a redundant electronic control system 102° is an electronic control system with a redundancy design, and actuators (103a and 103b) are also redundant with each other. The redundant electronic control system 102° may separately send a first execution signal to the actuator 103a and a second execution signal to the actuator 103b based on control information provided by an ECU 101. The actuator 103a and the actuator 103b have a same function type, for example, the two actuators are motors. In this case, an autonomous vehicle 100 may further include a propulsion system 104. The actuator 103a may output mechanical energy to the propulsion system 104 based on the received first execution signal, and the actuator 103b may output mechanical energy to the propulsion system 104 based on the received second execution signal.

However, when one of inverters (for example, the inverter 303) fails, the output component 304 cannot output the first execution signal to the actuator 103a, and consequently the actuator 103a stops working. Therefore, the propulsion system 104 can only receive the mechanical energy provided by the actuator 103b. In this case, the mechanical energy received by the propulsion system 104 is reduced in a short time, and a driving speed of the vehicle is suddenly reduced, which still poses a threat to personal and property safety of a user. In addition to the propulsion system, other systems such as a steering system and a braking system of the autonomous vehicle 100 also have such problems. Therefore, stability and safety of the redundant electronic control system need to be further improved.

In view of this, an embodiment of this application provides a redundant electronic control system, which may be used in devices such as an autonomous vehicle, an artificial heart, and a flight vehicle. If actuators are redundant in a device, the redundant electronic control system provided in this embodiment of this application can separately control the redundant actuators, and can still keep all the redundant actuators working when a single point of failure occurs in the redundant electronic control system.

The following describes in detail the embodiments of this application with reference to accompanying drawings. It should be noted that, in description of this application, "at least one" means one or more, and "a plurality of" means two or more. In view of this, "a plurality of" may also be understood as "at least two" in the embodiments of the present disclosure. The term "and/or" describes an association relationship for describing associated objects and represents that three relationships may exist. For example, A and/or B may represent the following three cases: Only A exists, both A and B exist, and only B exists. In addition, the character "/", unless otherwise specified, generally represents an "or" relationship between the associated objects. In addition, it should be understood that in the description of this application, terms such as "first" and "second" are merely used for distinguishing and description, but should not be understood as indicating or implying relative importance, or should not be understood as indicating or implying a sequence.

It should be noted that the "connection" in the embodiments of this application refers to an electric connection, and the connection between two electrical elements may be a direct or indirect connection between the two electrical elements. For example, a connection between A and B may represent that A and B are directly connected to each other, or A and B are indirectly connected to each other through one or more other electrical elements. For example, the connection between A and B may also represent that A is directly connected to C, C is directly connected to B, and A and B are connected to each other through C. A fault of any component (or unit) in the embodiments of this application not only includes a fault caused by an exception of the component (or unit), but also includes a fault caused by an exception a connection relationship, such as a short circuit or a broken circuit, between the component (or unit) and an adjacent component (or unit).

Figure 3:
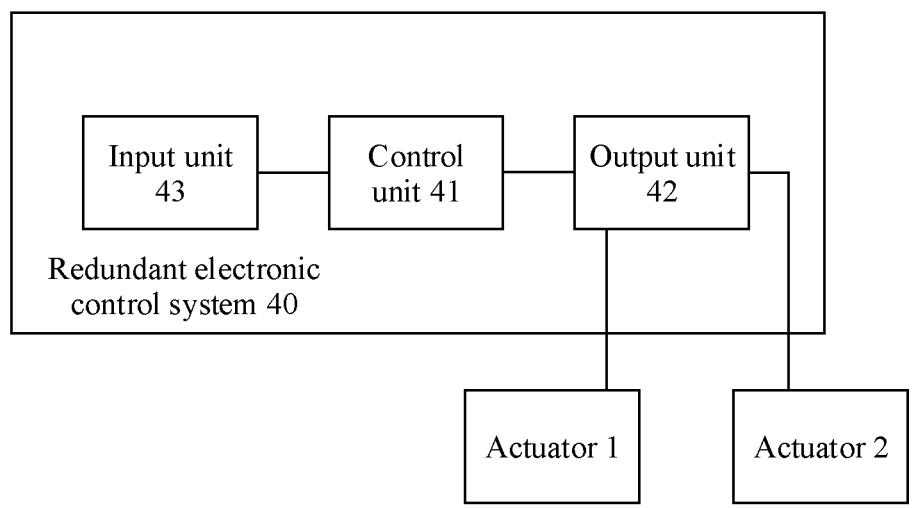
FIG. 3 is a schematic structural diagram of an electronic control system.

In some embodiments, as shown in FIG. 3, most electronic redundancy systems 40 mainly include a control unit 41 and an output unit 42. The control unit 41 is connected to the output unit 42, and the output unit 42 is separately connected to a plurality of actuators. It should be noted that, for ease of description, the following describes this embodiment of this application by using a case of double redundancy. To be specific, a unit on which a redundancy design is performed includes two components with a same function. However, during actual implementation, a case of triple or more redundancy may still be implemented by analogy with the case of double redundancy. Therefore, this should also be included in the embodiments of this application, and details are not described herein again.

For example, an actuator 1 and an actuator 2 in this embodiment of this application may be direct current brushed motors, direct current brushless motors, permanent-magnet synchronous motors, alternating current servo motors, stepper motors, or the like, or may be energy control elements such as controlled solenoid valves and hydraulic valves. This is not listed one by one in the embodiments of this application.

In the case of double redundancy, the actuators are also double-redundant. As shown in FIG. 3, the output unit 42 is connected to the actuator 1 and the actuator 2, and the actuator 1 and the actuator 2 are redundant actuators and have a same function type. For example, the actuator 1 and the actuator 2 may be two motors (brushed motors or brushless motors), or may be two groups of coils in one motor. For another example, the actuator 1 and the actuator 2 may alternatively be two hydraulic valves. For still another example, the actuator 1 and the actuator 2 may alternatively be two solenoid values or the like.

The control unit 41 may generate a first execution signal and a second execution signal, and the first execution signal is output to the actuator 1 and the second execution signal is output to the actuator 2 through the output unit 42. The first execution signal may drive the actuator 1 to work, and the second execution signal may drive the actuator 2 to work.

In some embodiments, the actuator 1 (the actuator 2 is in a similar way) may convert the first execution signal into a form of energy required by an autonomous vehicle, for example, a motor torque or an oil pressure. Energy output by the actuator 1 and the actuator 2 may act on a same output target, for example, a propulsion system, a steering system, or a braking system.

For example, energy may be transmitted between actuator 1 (the actuator 2 is in a similar way) and the output target. For example, the two may be mechanically connected, or may be field (such as an electric field or a magnetic field) coupled. This is not limited in the embodiments of this application.

The actuator 1 may output first energy to the output target based on the first execution signal, and the actuator 2 may output second energy to the output target based on the second execution signal. The first energy and the second energy can be combined with each other to jointly drive the output target to work.

Specific implementations of the first execution signal and the second execution signal correspond to the actuator 1 and the actuator 2. For example, when the actuator 1 is a motor, the control unit 41 may supply energy to the actuator 1 by using the first execution signal, and a larger power of the first execution signal indicates a larger output torque of the actuator 1. For another example, when the actuator 1 is an electrohydraulic valve, the control unit 41 may control an opening size of the electrohydraulic valve by using the first execution signal, to control an output liquid pressure of the electrohydraulic valve. The second execution signal and the actuator 2 are in a manner similar to that of the first execution signal and the first actuator, and details are not described herein again.

In a possible implementation, the redundant electronic control system 40 may further include an input unit 43, and the input unit 43 is connected to the control unit 41. The input unit 43 may receive input information, and provide the input information for the control unit 41. For example, the input signal may be input by an ECU of the autonomous vehicle.

The control unit 41 may separately calculate a first execution target of the actuator 1 and a second execution target of the actuator 2 based on the input information. For example, when the actuator 1 and the actuator 2 are motors, the first execution target may be a torque to be output by the actuator 1, and the second execution target may be a torque to be output by the actuator 2. When the actuator 1 and the actuator 2 are electrohydraulic valves, the first execution target may be a liquid pressure to be output by the actuator 1, the second execution target may be a liquid pressure to be output by the actuator 2, and the like. This is not listed one by one.

The control unit 41 may further generate the first execution signal based on the first execution target, and generate the second execution signal based on the second execution target, such that the first execution signal may drive the actuator 1 to execute the first execution target, and the second execution signal may drive the actuator 2 to execute the second execution target, to drive the autonomous vehicle to change a driving status.

In the embodiments of this application, any one of the control unit 41, the output unit 42, and the input unit 43 may have a redundancy design. A unit on which a redundancy design is performed may include a plurality of (two or more) components with a same function. When one of the components fails, the other components can still keep the actuator 1 and the actuator 2 working. In this embodiment of this application, the control unit 41 may not only detect whether the control unit 41 fails, but also detect whether the output unit 42 and the input unit 43 fail. For a specific implementation of detecting a fault by the control unit 41, refer to the conventional technology. Details are not described herein.

Next, cases in which a redundancy design is separately performed on the control unit 41, the output unit 42, and the input unit 43 are further described by using examples.

1. Redundancy of the Output Unit 42

Figure 4:
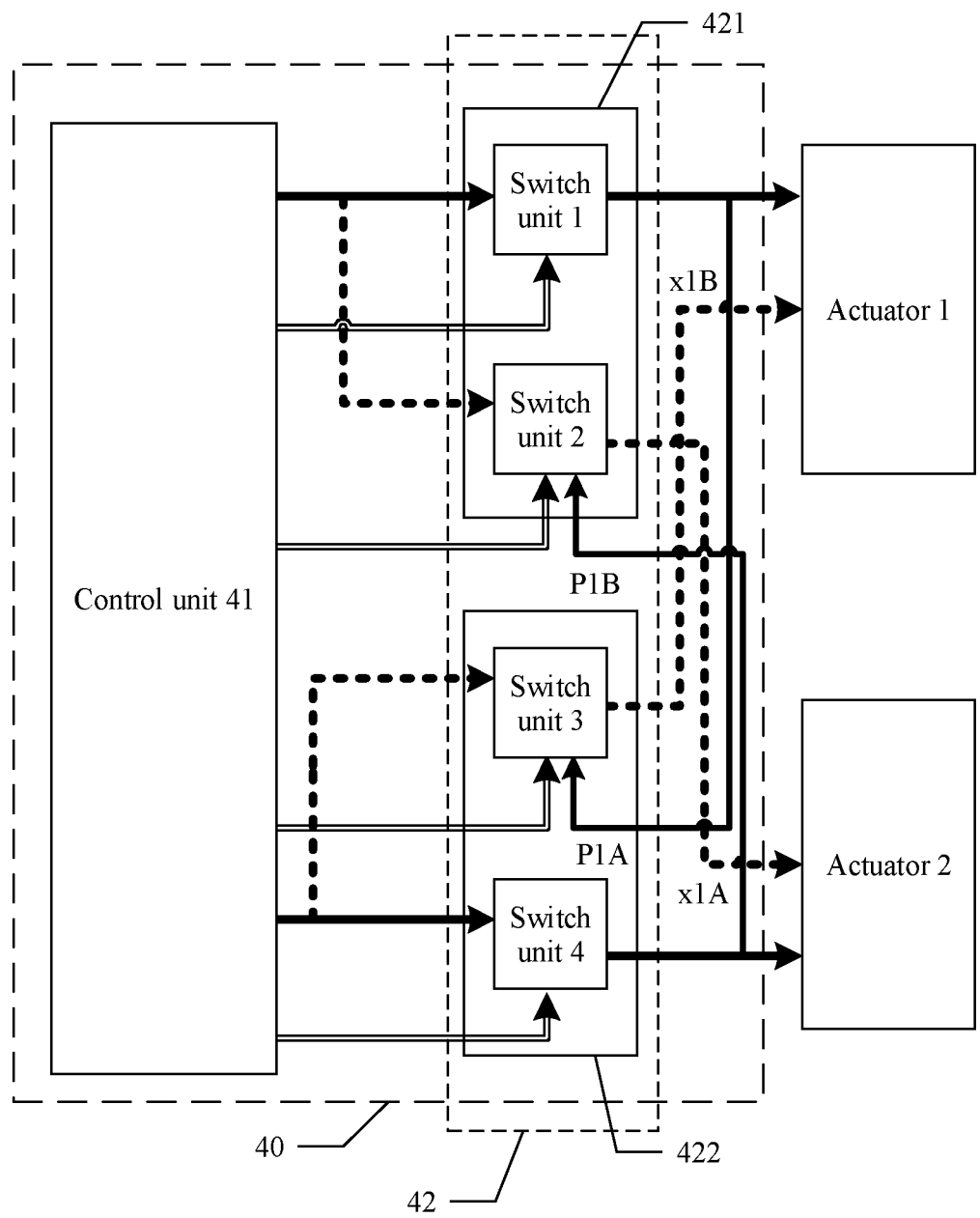
FIG. 4 is a schematic structural diagram of a redundant electronic control system with a redundant output unit according to an embodiment of this application.

In the embodiments of this application, the output unit 42 in the redundant electronic control system 40 is redundant. For example, as shown in FIG. 4, the redundant electronic control system 40 mainly includes the control unit 41 and the output unit 42, and the output unit 42 further includes an output component 421 and an output component 422. Hollow arrows represent control signals output by the control unit 41, solid arrows represent transmission paths of execution signals (or energy), and dashed arrows represent transmission paths of execution signals (or energy) after a single point of failure occurs in the redundant electronic control system 40.

A first output end of the output component 421 is connected to the actuator 1, a second output end of the output component 421 is connected to the actuator 2, a first output end of the output component 422 is connected to the actuator 1, and a second output end of the output component 422 is connected to the actuator 2. The control unit 41 is separately connected to a control end of the output component 421 and a control end of the output component 422.

In the embodiments of this application, the control unit 41 may control output paths of the output component 421 and the output component 422. For example, when both the output component 421 and the output component 422 work normally, the control unit 41 may control the output component 421 to output the first execution signal to the actuator 1, and control the output component 422 to output the second execution signal to the actuator 2. In this way, the actuator 1 can work based on the first execution signal, and the actuator 2 can work based on the second execution signal.

When the output component 421 fails, the control unit 41 may control the output component 422 to output the second execution signal to the actuator 2 and control the output component 422 to output the first execution signal to the actuator 1 such that the actuator 1 can still work based on the first execution signal (as shown by a dashed line x1B in FIG. 4).

When the output component 422 fails, the control unit 41 may control the output component 421 to output the first execution signal to the actuator 1 and control the output component 421 to output the second execution signal to the actuator 2 such that the actuator 2 can still work based on the second execution signal (as shown by a dashed line x1A in FIG. 4).

It can be learned that in the redundant electronic control system 40 provided in the embodiments of this application, a redundancy design is performed on the output unit 42, and the output unit 42 includes redundant output components: the output components 421 and 422. Even if any one of the output components (output component 421 or 422) fails, the actuator 1 and the actuator 2 can still keep working. This helps to improve stability of the redundant electronic control system 40 and safety of a device including a redundant electronic control system.

In the embodiments of this application, the control unit 41 may control the output paths of the output component 421 and the output component 422. For example, as shown in FIG. 4, the output component 421 includes a switch unit 1 and a switch unit 2. An input end of the switch unit 1 and an input end of the switch unit 2 are separately connected to the control unit 41, an output end of the switch unit 1 is connected to the actuator 1, and an output end of the switch unit 2 is connected to the actuator 2.

If the output component 422 works normally, the control unit 41 may switch on the switch unit 1 and switch off the switch unit 2 such that the first execution signal is output to the actuator 1 through the switch unit 1. If the output component 422 fails, the control unit 41 may further switch on the switch unit 2 while switching on the switch unit 1 such that the first execution signal is output to the actuator 1 and the second execution signal is output to the actuator 2 through the output component 421.

Similar to the output component 421, the output component 422 includes a switch unit 3 and a switch unit 4. An input end of the switch unit 3 and an input end of the switch unit 4 are separately connected to the control unit 41, an output end of the switch unit 3 is connected to the actuator 1, and an output end of the switch unit 4 is connected to the actuator 2.

If the output component 421 works normally, the control unit 41 may switch on the switch unit 4 and switch off the switch unit 3 such that the second execution signal is output to the actuator 2 through the switch unit 4. If the output component 421 fails, the control unit 41 may further switch on the switch unit 3 while switching on the switch unit 4 such that the first execution signal is output to the actuator 1 and the second execution signal is output to the actuator 2 through the output component 422.

In the embodiments of this application, a specific implementation form of the switch unit 1 (the switch units 2 to 4 are in a similar way) is mainly determined by a specific implementation form of the first execution signal. For example, assuming that the actuator 1 is a three-phase motor, the first execution signal may be in a form of a UVW three-phase alternating current. In this case, the switch unit 1 may include three corresponding switches, and the three corresponding switches may be respectively configured to transmit U-phase current, V-phase current, and W-phase current, to drive the actuator 1 to work.

For example, the switches in the switch unit 1 may be power elements such as a relay, a metal-oxide-semiconductor field-effect transistor (MOSFET), and an insulated-gate bipolar transistor (IGBT), or may be controllable switch elements of other types. Other switch units are in a similar way, and details are not described herein again.

To further improve the stability and safety of the redundant electronic system 400, as shown by a solid line P1A in FIG. 4, the output end of the switch unit 1 is further connected to a control end of the switch unit 3, and the first execution signal output by the switch unit 1 may be used as a control signal of the switch unit 3 to forcibly switch off the switch unit 3. Similarly, as shown by a solid line P1B in FIG. 4, the output end of the switch unit 4 may further be connected to a control end of the switch unit 2, and the second execution signal output by the switch unit 4 may be used as a control signal of the switch unit 2 to forcibly switch off the switch unit 2.

In this implementation, when the switch unit 1 works normally, this helps to prevent the switch unit 3 from false conduction, and further helps prevent the actuator 1 from generating an execution error. When the switch unit 4 works normally, this helps prevent the switch unit 2 from false conduction, and further helps prevent the actuator 2 from generating an execution error. Therefore, this implementation helps further improve the safety and stability of the redundant electronic control system 40.

2. Redundancy of the Control Unit 41

Figure 5:
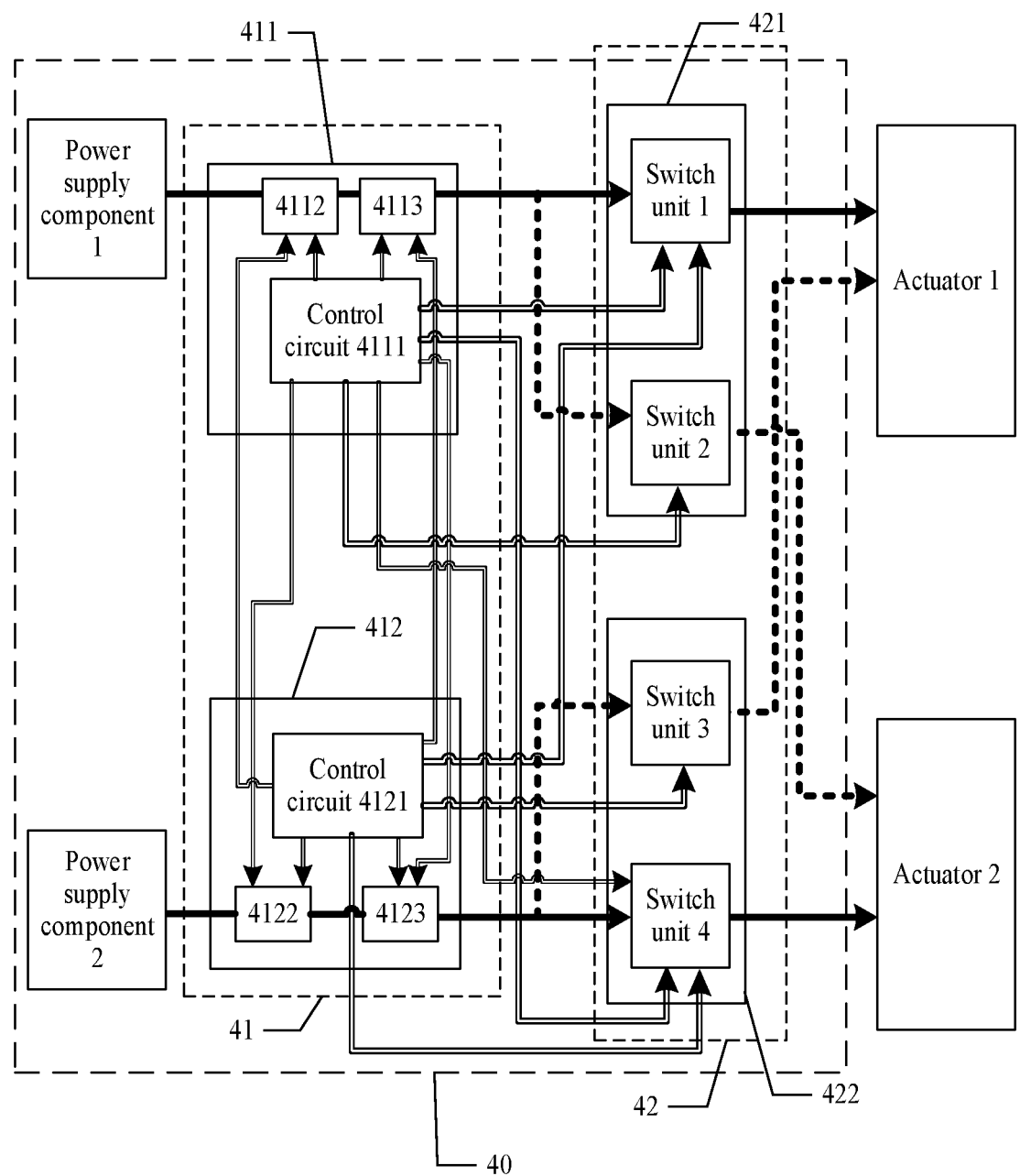
FIG. 5 is a schematic structural diagram of a redundant electronic control system with a redundant control unit according to an embodiment of this application.

In this embodiment of this application, a redundancy design may also be performed on the control unit 41 in the redundant electronic control system 40. For example, as shown in FIG. 5, the redundant electronic control system 40 mainly includes the control unit 41 and the output unit 42. The control unit 41 further includes a control component 411 and a control component 412. The control component 1 and the control component 2 are both connected to a control end and an input end of the output unit 42. An output end of the output unit 42 is separately connected to the actuator 1 and the actuator 2.

The control component 411 may generate the first execution signal, and control the output unit 42 to output the first execution signal to the actuator 1. For example, as shown in FIG. 5, the control component 411 includes a control circuit 4111, a power switch 4112, and a power converter 4113.

An input end of the power switch 4112 may receive a first power signal, an output end of the power switch 4112 is connected to an input end of the power converter 4113, and a control end of the power switch 4112 is connected to the control circuit 4111. An output end of the power converter 4113 is connected to the output unit 42, and a control end of the power converter 4113 is connected to the control circuit 4111. The control circuit 4111 is connected to a control end of the output unit 42, and the control circuit 4111 is connected to the control end of the output unit 42.

The control circuit 4111 may control the power switch 4112 to switch on a transmission path from the first power signal to the power converter 4113. The control circuit 4111 controls, based on the first execution target, the power converter 4113 to convert the first power signal into the first execution signal. Then, the control circuit 4111 may control the output unit 42 to output the first execution signal to the actuator 1.

In a possible implementation, the control circuit 4111 may further obtain, from the power converter 4113, a feedback signal of the first execution signal, and determine, based on the feedback signal, whether the power converter 4113 can work normally. In this embodiment of this application, the power converter 4113 also includes a plurality of switches. For example, these switches may be power elements such as a relay, a MOSFET, and an IGBT, or may be controllable switch elements of other types. The plurality of switches in the power converter 4113 may form a direct current H-bridge driving unit, a three-phase bridge driving unit, a multi-phase bridge driving unit, an alternating current driving unit, and the like. Other power converters are similar to the power converter 4113, and details are not described herein again.

Similar to the control component 411, the control component 412 may include a control circuit 4121, a power switch 4122, and a power converter 4123. An input end of the power switch 4122 may receive a second power signal, an output end of the power switch 4122 is connected to an input end of the power converter 4123, and a control end of the power switch 4122 is connected to the control circuit 4121. An output end of the power converter 4123 is connected to the output unit 42, a control end of the power converter 4123 is connected to the control circuit 4121, and the control circuit 4121 is connected to the control end of the output unit 42.

The control circuit 4121 may control the power switch 4122 to switch on a transmission path from the second power signal to the power converter 4123. The control circuit 4121 may control, based on the execution target of the actuator 2, the power converter 4123 to convert the second power signal into the second execution signal. Then, the control circuit 4121 may control the output unit 42 to output the second execution signal to the actuator 2.

Based on the structure of the control component 411 shown in FIG. 5, that the control component 411 fails mainly includes that the power switch 4112 and/or the power converter 4113 fails, and the control circuit 4111 fails. The following describes the details based on different cases.

Case 1: The control circuit 4111 fails.

In this case, the control component 412 may replace the control circuit 4111 to control the power switch 4112 and the power converter 4113. As shown in FIG. 5, the control circuit 4121 in the control component 412 is separately connected to the power switch 4112 and the power converter 4113. When the control circuit 4111 fails, the control circuit 4121 may control the power switch 4112 to switch on a transmission path from the first power signal to the power converter 4113, and the control circuit 4121 may control, based on the first execution target of the actuator 1, the power converter 4113 to convert the first power signal into the first execution signal. Then, the control circuit 4121 may control the output unit 42 to output the first execution signal to the actuator 1.

Case 2: The power switch 4112 and/or the power converter 4113 fails.

In this case, the control component 412 may generate the first execution signal and the second execution signal, and control the output unit 42 to output the first execution signal to the actuator 1 and output the second execution signal to the actuator 2. The first execution signal and the second execution signal that are generated by the control component 412 may be implemented as two independent execution signals, or being included in a combined signal. In other words, the control component 412 may generate the combined signal, and the combined signal includes the first execution signal and the second execution signal.

In some embodiments, in a possible implementation, as shown in FIG. 5, the control circuit 4121 may control, based on the first execution target of the actuator 1 and the second execution target of the actuator 2, the power converter 4123 to convert the second power signal into a combined signal. Then, the control circuit 4121 may control the output unit 42 to output a part of the combined signal to the actuator 1 as the first execution signal, and output another part of the combined signal to the actuator 2 as the second execution signal.

It should be noted that, in this implementation, the actuator 1 and the actuator 2 may be actuators that meet a synchronization relationship, in other words, the actuator 1 and the actuator 2 are actuators having a same input/output conversion relationship, the first execution signal and the second execution signal are synchronized, and output energy of the actuator 1 and output energy of the actuator 2 also change synchronously. For example, the actuator 1 and the actuator 2 may be brushed direct current motors. For another example, the actuator 1 and the actuator 2 may be brushless direct current motors or permanent-magnet synchronous motors, and the actuator 1 and the actuator 2 have a same output shaft. For another example, the actuator 1 and the actuator 2 may be brushless direct current motors or permanent-magnet synchronous motors, and the actuator 1 and the actuator 2 have a same reduction ratio when combining outputs.

Figure 6:
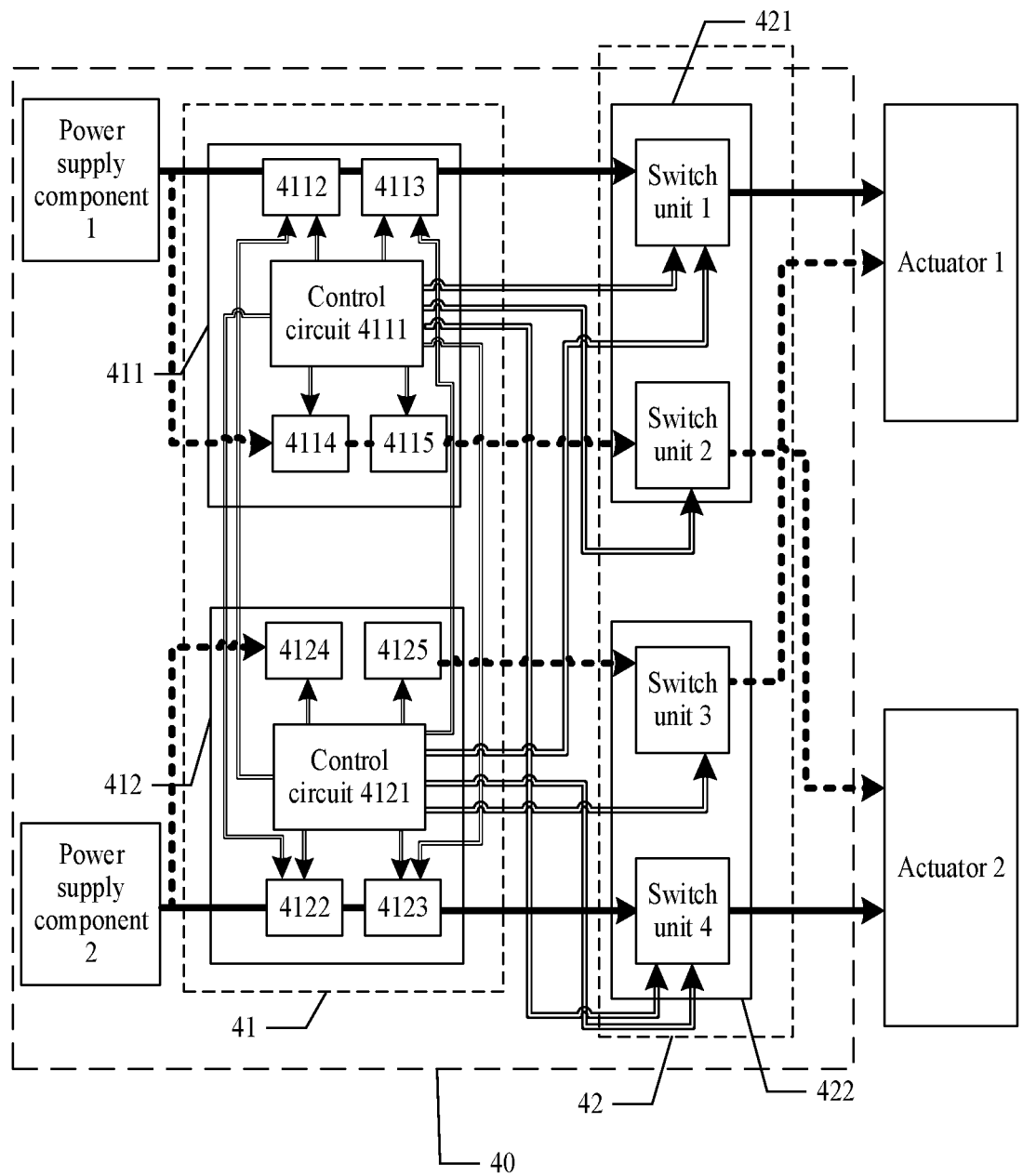
FIG. 6 is a schematic structural diagram of another redundant electronic control system with a redundant control unit according to an embodiment of this application.

In another possible implementation, as shown in FIG. 6, the control component 412 further includes a power switch 4124 and power converter 4125. An input end of the power switch 4124 may receive the second power signal, an output end of the power switch 4124 is connected to an input end of the power converter 4125, and a control end of the power switch 4124 is connected to the control circuit 4121. An output end of the power converter 4125 is connected to the output unit 42, and a control end of the power converter 425 is connected to the control circuit 4121.

When the power switch 4112 and/or the power converter 4113 fails, the control circuit 4121 may control the power switch 4124 to switch on a transmission path from the second power signal to the power converter 4125. The control circuit 4121 may control, based on the first execution target of the actuator 1, the power converter 4125 to convert the second power signal into the first execution signal. Then, the control circuit 4121 may control the output unit 42 to output the first execution signal to the actuator 1.

It should be noted that in this implementation, the actuator 1 and the actuator 2 may be actuators that meet a synchronization relationship, or may be actuators that do not meet a synchronization relationship. This is not limited in this embodiment of this application.

Based on same consideration, as shown in FIG. 5 and FIG. 6, the control component 411 may include the control circuit 4111, the power switch 4112, and the power converter 4113. In a possible implementation, the control component 411 may further include a power switch 4114 and a power converter 4115. A function of the control circuit 4111 is similar to that of the control circuit 4121, a function of the power switch 4112 is similar to that of the power switch 4122, a function of the power converter 4113 is similar to that of the power converter 4123, a function of the power switch 4114 is similar to that of the power switch 4124, and a function of the power converter 4115 is similar to that of the power converter 4125. When the control component 412 fails, the control component 411 may perform the foregoing processes, and details are not described herein again.

For example, as shown in FIG. 5, the redundant electronic control system 40 further includes a power supply component 1 and a power supply component 2. For example, the power supply component 1 may provide the first power signal for the control component 411, and the power supply component 2 may provide the second power signal for the control component 412.

In another possible implementation, the power supply component 1 may alternatively be connected to the control component 412, the power supply component 2 is connected to the control component 411, and the power supply component 1 and the power supply component 2 may output the first power signal to the control component 411 in parallel, and output the second power signal to the control component 412 in parallel.

In this implementation, even if any one of the power supply components fails, the other power supply component can still supply power to the control component 411 and the control component 412. This helps to further improve the safety and stability of the redundant electronic control system.

Figure 7:
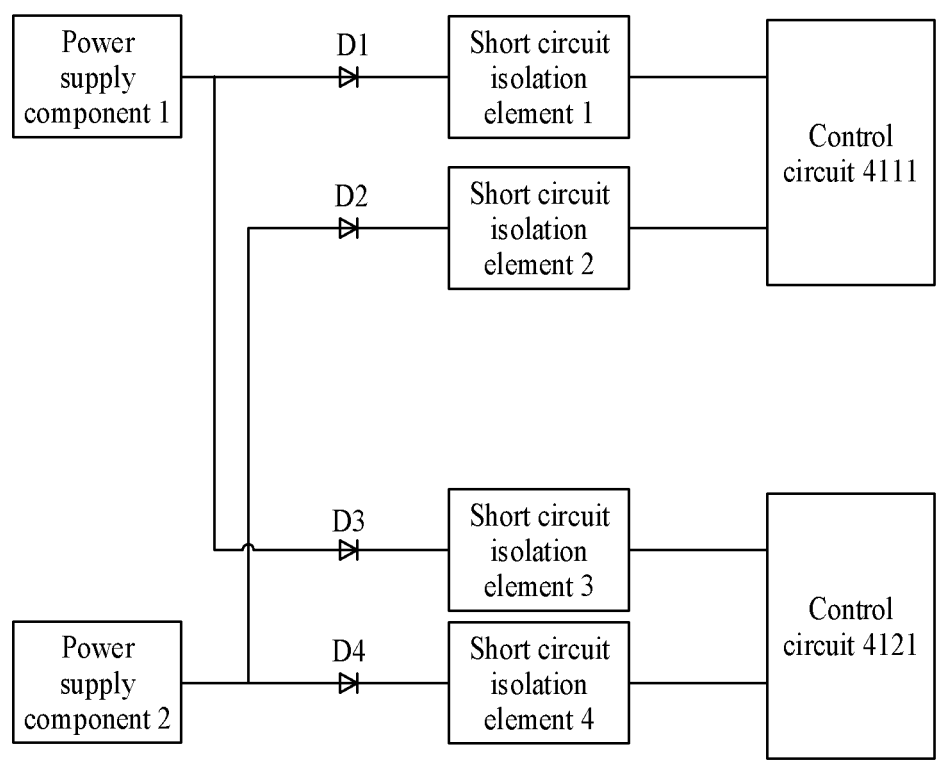
FIG. 7 shows a schematic diagram of a structure between power supply components and control circuits in a redundant electronic control system according to an embodiment of this application.

In the embodiments of this application, the power supply component 1 may alternatively be separately connected to the control circuit 4111 and the control circuit 4121, and the power supply component 2 may alternatively be separately connected to the control circuit 4111 and the control circuit 4121. FIG. 7 shows an example of a schematic diagram of a partial structure between the power supply components and the control circuits in the redundant electronic control system 40. As shown in FIG. 7, the power supply component 1 may further supply power to the control circuit 4111 and the control circuit 4121. The power supply component 2 may also supply power to the control circuit 4121 and the control circuit 4111.

To further improve the stability and safety of the redundant electronic control system 40, as shown in FIG. 7, a diode D1 is further included between the power supply component 1 and the control circuit 4111, and a diode D3 is further included between the power supply component 1 and the control circuit 4121. An anode of the diode D1 is connected to the power supply component 1, a cathode of the diode D1 is connected to the control circuit 4111, an anode of the diode D3 is connected to the power supply component 1, and a cathode of the diode D3 is connected to the control circuit 4121. In this implementation, overvoltage isolation may be performed on the control circuit 4111 and the control circuit 4121, to prevent a voltage of a power supply port that connects the control circuit 4111 and the power supply component 1 from flowing back into the control circuit 4121 because of an excessively high transient voltage. This helps further improve the stability and safety of the redundant electronic control system 40.

Based on the same principle, a diode D2 may further be included between the power supply component 2 and the control circuit 4111, and a diode D4 may further be included between the power supply component 2 and the control circuit 4121. A specific structure is not described again.

Furthermore, a short circuit isolation element 1 may be further included between the power supply component 1 and the control circuit 4111. The short circuit isolation element 1 may be a self-recovery fuse, a self-recovery switch, or the like. A short circuit isolation element 3 may be further included between the power supply component 1 and the control circuit 4121. When the control circuit 4111 is short-circuited, for example, a port connected to the power supply component 1 and a port connected to the power supply component 2 are short-circuited, a relatively large current is generated. As a result, the short circuit isolation element 1 and the short circuit isolation element 2 are automatically disconnected, thereby protecting the power supply component 1, the power supply component 2, and the control circuit 4121. This helps to further improve the stability and safety of the redundant electronic control system 40.

Based on the same principle, a short circuit isolation element 2 may be further included between the power supply component 2 and the control circuit 4111, and a short circuit isolation element 4 may be further included between the power supply component 2 and the control circuit 4121. A specific structure is not described again.

In a possible implementation, after the redundant electronic control system 40 is powered on, the control circuit 4111 may further detect an output status of the power converter 4113, for example, detect whether the power converter 4113 can accurately output the first execution signal under control of the control circuit 4111. The control circuit 4111 may further perform a logic built-in self test (LBIST) to test whether the power converter 4113 and switches in the switch unit 1 and the switch unit 2 fail, thereby greatly improving the coverage of latent fault detection for related components in terms of a functional safety feature, and further improving a latent-fault metric.

3. Redundancy of the Input Unit 43

Figure 8:
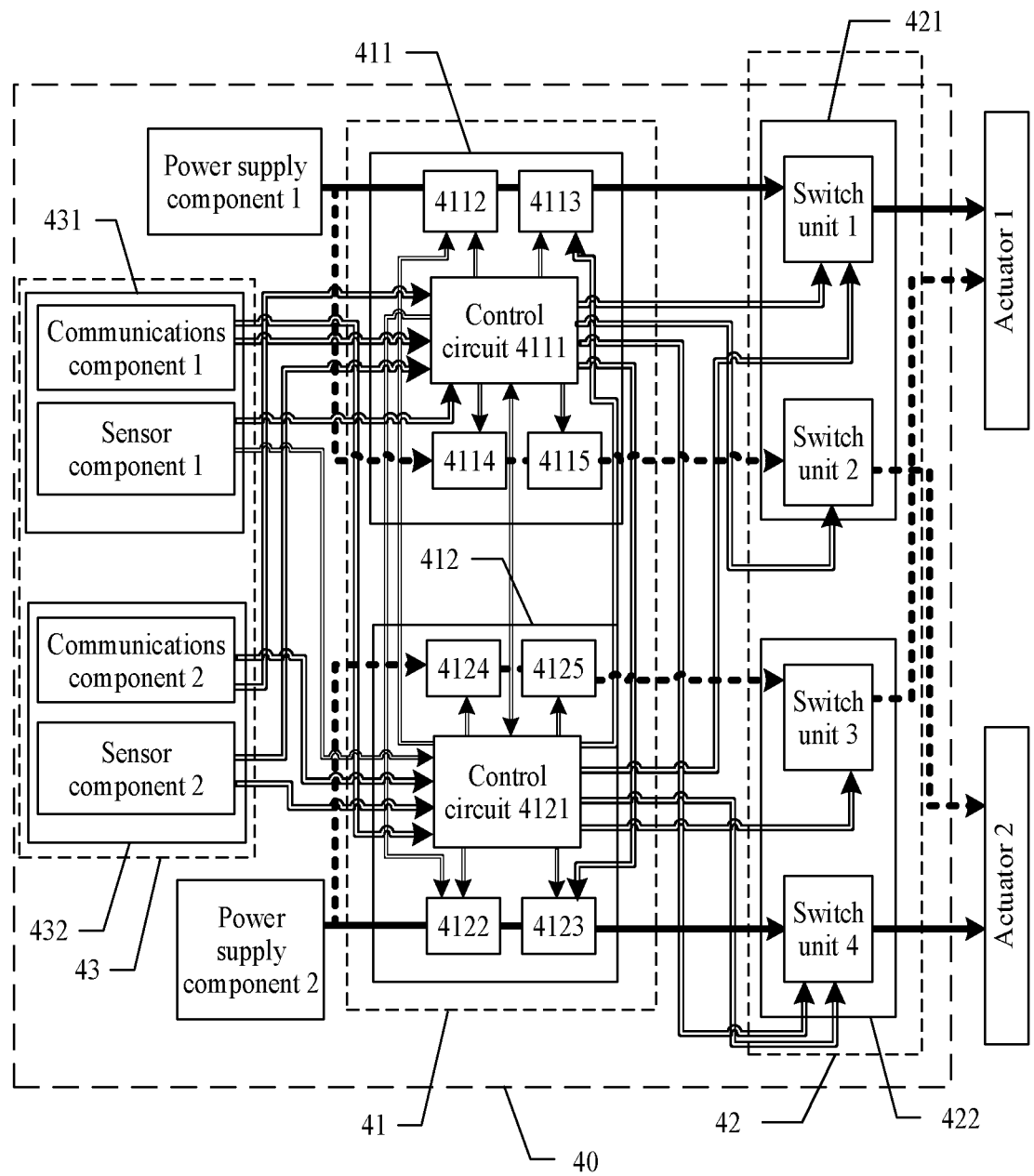
FIG. 8 is a schematic structural diagram of a redundant electronic control system with a redundant output unit according to an embodiment of this application.

In the embodiments of this application, the input unit 43 in the redundant electronic control system 40 is redundant. For example, as shown in FIG. 8, the redundant electronic control system 40 mainly includes the input unit 43, the control unit 41, and the output unit 42. The input unit 43 further includes an input component 431 and an input component 432. The control unit 41 includes the control component 411.

In the redundant electronic control system 40, the input component 431 and the input component 432 are respectively connected to the control component 411, the control component 411 is connected to the output unit 42, and the output unit 42 is connected to the actuator 1.

The input component 431 may obtain first input information, and output the first input information to the control component 411. The input component 432 may obtain second input information, and output, when the input component 431 fails, the second input information to the control component 411.

The control component 411 may obtain the first execution target of the actuator 1 through calculation based on the first input information or the second input information. Then, the control component 411 may generate the first execution signal based on the first execution target, and control the output unit 42 to output the first execution signal to the actuator 1.

In this implementation, when any one of the input component 431 and the input component 432 fails, the other input component can still provide an input signal for the control component 411 such that the control component 411 can continuously work. This helps improve the safety and stability of the redundant electronic control system 40.

It should be noted that faults of the input component 431 (the input component 432 is in a similar way) not only includes a fault caused by a function exception of the input component 431, but also includes a fault caused by a connection exception between the input component 431 and the control unit 41, and further includes a fault caused by a function exception of a port through which the control unit 41 receives the first input information, and the like. In these cases, the control unit 41 may consider all the faults as the faults of the input component 431.

In the embodiments of this application, a redundancy design may also be performed on the control unit 41. As shown in FIG. 8, the control unit 41 may further include the control component 412. A specific structure is not described again.

Based on a redundant structure of the control unit 41, the input component 431 and the input component 432 may be further connected to the control component 412. The input component 432 may further output the second input information to the control component 412. The input component 431 may further output the first input information to the control component 411 when the input component 432 fails.

The control component 412 may obtain the second execution target of the actuator 2 through calculation based on the first input information or the second input information. Then, the control component 412 may generate the second execution signal based on the second execution target, and control the output unit 42 to output the second execution signal to the actuator 2.

In another possible implementation, as shown in FIG. 8, the control component 411 is connected to the control component 412. When the input component 432 fails, the control component 411 may also forward, to the control component 412, the first input information sent by the input component 431. When the input component 431 fails, the control component 412 may also forward, to the control component 411, the second input information sent by the input component 432.

In a possible implementation, the control component 411 and the control component 412 may further detect a working status of each other, exchange arbitration information, and the like. This is not limited in this embodiment of this application. For example, a connection between the control component 411 and the control component 412 may include a plurality of information transmission channels through which a plurality of types of signals can be transmitted, such as an input/output hard wire signal, a serial peripheral interface (SPI) bus communication signal, and a local interconnect network (LIN) bus signal.

In this implementation, a plurality of types of signals may be used to transfer information between the control component 411 and the control component 412. When any one of the information transmission channels fails, another information transmission channel may be used to transfer information between the control component 411 and the control component 412. In addition, the control component 411 and the control component 412 may further determine, by using information transmitted through different information transmission channels, accuracy of information received by the control component 411 and the control component 412, thereby helping prevent misjudgment. Therefore, this implementation helps further improve the safety and stability of the redundant electronic control system 40.

It should be noted that the input components (the input component 431 and the input component 432) in this embodiment of this application have a plurality of possible implementations, and may receive one or more types of input information.

For example, the input component 431 may include a communications component 1, and the input component 432 may include a communications component 2. The communications component 1 may receive control information, and send the control information to the control component 411. The communications component 2 may also receive the control information, and send the control information to the control component 412. In other words, both the first input information and the second input information may include the control information. For example, the control information may be sent by the ECU to the communications component 1 and the communications component 2.

To further improve the safety and stability of the redundant electronic control system 40, when the communications component 2 fails, the communications component 1 may further send the control information to the control component 412. In another possible implementation, the control component 411 may forward the control information to the control component 412. When the communications component 1 fails, the communications component 2 may further send the control information to the control component 411. In another possible implementation, the control component 412 may forward the control information to the control component 411.

For another example, as shown in FIG. 8, the input component 431 includes a sensor component 1, and the input component 432 includes a sensor component 2. The sensor component 1 may generate first sensing information, and output the first sensing information to the control component 411. The sensor component 2 may generate second sensing information, and output the second sensing information to the control component 412. In other words, the first input information includes the first sensing information, and the second input information includes the second sensing information.

For example, the sensor component 1 may include a plurality of sensors, and different sensors may detect different parameters. For example, the plurality of sensors in the sensor component 1 may be separately configured to detect various parameters such as a temperature, a pressure, a voltage, a current, a flow rate, an angle, and a torque.

To further improve the safety and stability of the redundant electronic control system 40, when the sensor component 2 fails, the sensor component 1 may further output the first sensing information to the control component 412. In another possible implementation, the control component 411 may forward the first sensing information to the control component 412 such that the control component 412 can generate the second execution signal based on the first sensing information.

When the sensor component 1 fails, the sensor component 2 may further output the second sensing information to the control component 411. In another possible implementation, the control component 412 may forward the second sensing information to the control component 411 such that the control component 411 can generate the first execution signal based on the second sensing information.

In the embodiments of this application, the control component 411 and the control component 412 may further detect whether the sensor component 1 and the sensor component 2 fail. For example, the control component 411 may be used as a main control component in the redundant electronic control system. The control component 411 may monitor the second sensing information, to detect, based on the first sensing information and the second sensing information, whether the sensor component 1 and the sensor component 2 fail. When determining that the sensor component 1 or the sensor component 2 fails, the control component 411 may send first detection information to the control component 412. The first detection information may indicate the control component 412 to detect again whether the sensor component 1 and the sensor component 2 fail.

In this implementation, the control component 411 detects whether the sensor component 1 and the sensor component 2 fail, and the control component 412 verifies a detection result. This helps improve accuracy of fault detection by the sensor component 1 and the sensor component 2, thereby helping further improve the safety and stability of the redundant electronic control system 40.

For example, the first sensing information may include first sensing verification information and second sensing verification information. The first sensing verification information is carried in a first sensing signal, and the second sensing verification information is carried in a second sensing signal. The control component 411 may detect, based on consistency between the first sensing verification information and the second sensing verification information, whether the sensor component 1 fails.

When the sensor component 1 can work normally, the sensor component 1 may output the first sensing verification information and the second sensing verification information that are consistent with each other. Therefore, when the first sensing verification information is different from the second sensing verification information, the control component 411 may determine that the sensor component 1 fails.

When the first sensing verification information is consistent with the second sensing verification information, the control component 411 may further monitor the second sensing information output by the sensor component 2. The monitoring process may include bus data monitoring, analog-to-digital (AD) signal conversion, and the like.

Then, the control component 411 may detect, based on the first sensing information and the second sensing information, whether the sensor component 2 fails. When both the sensor component 1 and the sensor component 2 can work normally, the first sensing information and the second sensing information that are output by the sensor component 1 and the sensor component 2 are consistent. Therefore, when the first sensing verification information is consistent with the second sensing verification information, and the first sensing information is inconsistent with the second sensing information, the control component 411 may determine that the sensor component 2 fails.

Similar to the first sensing signal, the second sensing signal may also include third sensing verification information and fourth sensing verification information. The third sensing verification information is carried in a third sensing signal, and the fourth sensing verification information is carried in the fourth sensing signal. The control component 412 may detect, based on consistency between the first sensing verification information, the second sensing verification information, the third sensing verification information, and the fourth sensing verification information, whether the sensor component 2 fails.

The control component 411 monitors the second sensing information, and verifies, by using the monitored second sensing information and the received first sensing information, whether the sensor component 1 and the sensor component 2 fail. This helps improve diagnosis coverage of a safety mechanism of detecting the first sensing signal and the second sensing signal by the redundant electronic control system 40. In the meantime, the control component 411 monitors only the sensor component 2 such that interference to the second sensing signal can be avoided. The control component 412 is in a similar way, and details are not described herein again.

It should be noted that the control unit 41, the output unit 42, and the input unit 43 in this embodiment of this application may be separately implemented, may be simultaneously implemented, or may be partially simultaneously implemented. As shown in FIG. 8, a redundancy design is performed on the foregoing three units. In a specific implementation structure, the redundant electronic control system 40 shown in FIG. 8 may be formed by a plurality of ECUs in redundancy, for example, each ECU includes an input component, a control component, and an output component; the redundant electronic control system 40 may be formed by a plurality of circuit boards in redundancy, for example, each circuit board includes an input component, a control component, and an output component; the redundant electronic control system 40 may be integrated on a circuit board; the redundant electronic control system 40 may be a multi-core chip with a content redundancy architecture; the redundant electronic control system 40 may be a chip set with a content redundancy architecture; or the like. This is not limited in this embodiment of this application.

The redundant electronic control system 40 shown in FIG. 8 can adapt to a single point of failure or multiple points of failure in different cases. The following three fault scenarios are used as examples for further description.

Fault Scenario 1

As shown in FIG. 8, the communications component 1 may provide the received control information for the control component 411, and the communications component 2 may provide the received control information for the control component 412.

When the communications component 1 fails, the control component 412 may forward, to the control component 411, the control information sent by the communications component 2. The control circuit 4111 controls the power switch 4112 to switch on the transmission path from the first power signal to the power converter 4113. The control circuit 4111 controls, based on the control information, the power converter 4113 to convert the first power signal into the first execution signal. Then, the control circuit 4111 switches on the switch unit 1, and switches off the switch unit 2, to control the output component 421 to output the first execution signal to the actuator 1.

When the communications component 2 fails, the control component 411 may forward, to the control component 412, the control information sent by the communications component 1. The control circuit 4121 controls the power switch 4122 to switch on the transmission path from the second power signal to the power converter 4123. The control circuit 4121 controls, based on the control information, the power converter 4123 to convert the second power signal into the second execution signal. Then, the control circuit 4121 switches on the switch unit 4, and switches off the switch unit 3, to control the output component 422 to output the second execution signal to the actuator 2.

When the sensor component 1 fails, the control component 411 may receive the second sensing information generated by the sensor component 2. The control circuit 4111 controls the power switch 4112 to switch on the transmission path from the first power signal to the power converter 4113. The control circuit 4111 controls, based on the second sensing information, the power converter 4113 to convert the first power signal into the first execution signal. Then, the control circuit 4111 switches on the switch unit 1, and switches off the switch unit 2, to control the output component 421 to output the first execution signal to the actuator 1.

When the sensor component 2 fails, the control component 412 may receive the first sensing information generated by the sensor component 1. The control circuit 4121 controls the power switch 4122 to switch on the transmission path from the second power signal to the power converter 4123. The control circuit 4121 controls, based on the first sensing information, the power converter 4123 to convert the second power signal into the second execution signal. Then, the control circuit 4121 switches on the switch unit 4, and switches off the switch unit 3, to control the output component 422 to output the second execution signal to the actuator 2.

Fault Scenario 2

When any one or more nodes of the power supply component 1, the power switch 4112, the power converter 4113, and the switch unit 1 fail, the control circuit 4111 may cut off an output path of the first execution signal. For example, the control circuit 4111 may switch off the switch unit 1.

In a possible implementation, the control circuit 4111 may detect working statuses of the power supply component 1, the power switch 4112, the power converter 4113, and the switch unit 1. When any one or more nodes of the power supply component 1, the power switch 4112, the power converter 4113, and the switch unit 1 fail, the control circuit 4111 may send first indication information to the control circuit 4121, to indicate the control component 412 to generate the first execution signal and the second execution signal.

In another possible implementation, the control circuit 4121 may also detect the working statuses of the power supply component 1, the power switch 4112, the power converter 4113, and the switch unit 1. When any one or more nodes of the power supply component 1, the power switch 4112, the power converter 4113, and the switch unit 1 fail, the control component 412 generates the first execution signal and the second execution signal.

The control component 412 generates the first execution signal and the second execution signal. The control circuit 4121 switches on the switch unit 3 and the switch unit 4, and the first execution signal is output to the actuator 1 through the switch unit 3, and the second execution signal is output to the actuator 2 through the switch unit 4. For a specific process, refer to the foregoing embodiment. Details are not described herein again.

It should be noted that, for a fault caused by an exception of one or more of a plurality of ports for connecting the control circuit 4111 to the power supply component 1, the power switch 4112, the power converter 4113, and the switch unit 1, the control circuit 4111 may also consider the fault as a fault of a corresponding node. The control component 4121 is in a similar way, and details are not described herein again.

Similarly, when any one or more nodes of the power supply component 2, the power switch 4122, the power converter 4123, and the switch unit 4 fail, the control circuit 4121 may cut off an output path of the second execution signal. The control component 411 generates the first execution signal and the second execution signal. The control circuit 4111 switches on the switch unit 1 and the switch unit 2, and the first execution signal is output to the actuator 1 through the switch unit 1, and the second execution signal is output to the actuator 2 through the switch unit 2. For a specific process, refer to the foregoing embodiment. Details are not described herein again.

Fault Scenario 3

When the control circuit 4111 fails, the control circuit 4121 may control the power switch 4112 and the power converter 4113 such that the power converter 4113 can receive the first power signal through the power switch 4112, and convert the first power signal into the first execution signal under control of the control circuit 4121. The control circuit 4121 may further switch on the switch unit 1 such that the first execution signal is output to the actuator 1.

It should be noted that, faults, such as a fault caused by an exception of ports for connecting the control circuit 4111 to the power switch 4112, the power converter 4113, and the switch unit 1, and a fault caused by exceptions of a connection between the control circuit 4111 and the power switch 4112, a connection between the control circuit 4111 and the power converter 4113, and a connection between the control circuit 4111 and the switch unit 1, may alternatively be considered as faults of the control circuit 4111. The control circuit 4121 is in a similar way, and details are not described herein again.

When both the control circuit 4111 and the switch unit 1 fail, the control circuit 4121 may further control the power switch 4112 and the power converter 4113 to generate the second execution signal, and the control circuit 4121 controls the power switch 4122 and the power converter 4123 to generate the first execution signal. The control circuit 4121 switches on the switch unit 2 such that the second execution signal is output to the actuator 2, and the control circuit 4121 switches on the switch unit 3 such that the first execution signal is output to the actuator 1.

When the control circuit 4121 fails, the control circuit 4111 may control the power switch 4122 and the power converter 4123 such that the power converter 4123 can receive the second power signal through the power switch 4122, and convert the second power signal into the second execution signal under control of the control circuit 4111. The control circuit 4111 may further switch on the switch unit 4 such that the second execution signal is output to the actuator 2.

When both the control circuit 4121 and the switch unit 4 fail, the control circuit 4111 may further control the power switch 4122 and the power converter 4123 to generate the first execution signal, and the control circuit 4111 controls the power switch 4112 and the power converter 4113 to generate the second execution signal. The control circuit 4111 switches on the switch unit 2 such that the second execution signal is output to the actuator 2, and the control circuit 4121 switches on the switch unit 3 such that the first execution signal is output to the actuator 1.

It can be learned from the foregoing embodiments that the redundant electronic control system 40 provided in the embodiments of this application can flexibly adapt to different fault scenarios, and can still maintain stable output when the redundant electronic control system 40 fails. It should be noted that the foregoing fault scenarios are merely examples, and fault scenarios to which the embodiments of this application is applicable are not limited thereto, and are not listed one by one in the embodiments of this application. In some faults, there may be a plurality of feasible execution signal output manners. In a specific implementation process, flexible selection may be performed based on an actual requirement. This is not limited in the embodiments of this application.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc read-only memory (CD-ROM), an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A redundant electronic control system, comprising:
a first switcher configured to couple to a first actuator and a second actuator, wherein the first switcher comprises a first relay, a first metal-oxide-semiconductor field-effect transistor (MOSFET), or a first insulated-gate bipolar transistor (IGBT);
a second switcher configured to couple to the first actuator and the second actuator, wherein the second switcher comprises a second relay, a second MOSFET, or a second IGBT;
a first controller coupled to the first switcher and the second switcher and configured to:
generate a first execution signal; and
control the first switcher to output the first execution signal to the first actuator, wherein the first controller comprises:
a first controllable power switch configured to receive a first power signal, wherein the first controllable power switch comprises a third relay, a third MOSFET, or a third IGBT;
a first electronic power converter coupled to the first controllable power switch and the first switcher, and configured to convert the first power signal into the first execution signal; and
a first electronic control circuit coupled to the first controllable power switch and the first electronic power converter, and configured to:
control the first controllable power switch to switch on a transmission path from the first power signal to the first electronic power converter;
control, based on a first execution target of the first actuator, the first electronic power converter to convert the first power signal into the first execution signal to drive the first actuator to execute the first execution target; and
switch on a first controllable switch to output the first execution signal to the first actuator; and
a second controller coupled to the first switcher and the second switcher and configured to:
generate a second execution signal;
control the second switcher to output the second execution signal to the second actuator; and
control the second switcher to output the first execution signal to the first actuator when the first switcher fails, wherein the second controller comprises:
a second controllable power switch configured to receive a second power signal, wherein the second power controllable switch comprises a fourth relay, a fourth MOSFET, or a fourth IGBT;
a second electronic power converter coupled to the second power controllable switch and the second switcher, and configured to convert the second power signal into the second execution signal; and
a second electronic control circuit coupled to the second power controllable switch and the second electronic power converter, and configured to:
control the second power controllable switch to switch on the transmission path from the second power signal to the second electronic power converter;
control, based on a second execution target of the second actuator, the second electronic power converter to convert the second power signal into the second execution signal to drive the second actuator to execute the second execution target; and
switch on a second controllable switch to output the second execution signal to the second actuator, and
wherein the first controller is further configured to control the first switcher to output the second execution signal to the second actuator when the second switcher fails.

2. The redundant electronic control system of claim 1, wherein the first switcher further comprises:
the first controllable switch configured to couple to the first actuator and the first controller, wherein the first controllable switch comprises a fifth relay, a fifth MOSFET, or a fifth IGBT; and
a third controllable switch configured to couple to the second actuator and the first controller, wherein the third controllable switch comprises a sixth relay, a sixth MOSFET, or a sixth IGBT,
wherein the first controller is further configured to:
switch on the first controllable switch to output the first execution signal to the first actuator; and
switch on the third controllable switch to output the second execution signal to the second actuator when the second switcher fails.

3. The redundant electronic control system of claim 2, wherein the second controller is further coupled to the first controllable switch, the first controllable power switch, and the first electronic power converter, and configured to:
control the first controllable power switch to switch on the transmission path from the first power signal to the first electronic power converter when the first electronic control circuit fails;
control, based on a third execution target of the first switcher, the first electronic power converter to convert the first power signal into the first execution signal; and
switch on the first controllable switch to output the first execution signal to the first actuator.

4. The redundant electronic control system of claim 3, wherein the second controller is further configured to:
generate the first execution signal and the second execution signal when the first controllable power switch or the first electronic power converter fails; and
control the second switcher to output the first execution signal to the first actuator and output the second execution signal to the second actuator.

5. The redundant electronic control system of claim 4, wherein the first electronic control circuit is further configured to:
control, based on the first execution target and a third fourth execution target of the second actuator, the first electronic power converter to convert the first power signal into a combined signal when the second switcher fails, wherein the combined signal comprises the first execution signal and the second execution signal;
switch on the first controllable switch to output the first execution signal to the first actuator; and
switch on the third controllable switch to output the second execution signal to the second actuator.

6. The redundant electronic control system of claim 4, wherein the first controller further comprises:
a third controllable power switch configured to receive the first power signal, wherein the third controllable power switch comprises a seventh relay, a seventh MOSFET, or a seventh IGBT; and a third electronic power converter coupled to the third controllable power switch and configured to convert the first power signal into the second execution signal, wherein the first electronic control circuit is coupled to the third controllable power switch and the third electronic power converter, and configured to:
  control the third controllable power switch to switch on the transmission path from the first power signal to the third electronic power converter when the second switcher fails;
  control, based on a fourth execution target of the second actuator, the third electronic power converter to convert the first power signal into the second execution signal; and
  switch on the third controllable switch to output the second execution signal to the second actuator.

7. The redundant electronic control system of claim 6, wherein the second controllable switch is coupled to the second switcher, and wherein the second controllable switch is configured to switch off the second switcher in response to the second execution signal.

8. The redundant electronic control system of claim 7, wherein the second switcher comprises:
  the second controllable switch configured to couple to the first actuator, wherein the second controllable switch comprises an eighth relay, an eighth MOSFET, or an eighth seventh IGBT; and
  a fourth controllable switch configured to couple to the second actuator, wherein the fourth controllable switch comprises a ninth relay, a ninth MOSFET, or a ninth IGBT,
  wherein the second controllable switch and the fourth controllable switch are coupled to the second controller and configured to:
    switch on the fourth controllable switch to output the second execution signal to the second actuator; and
    switch on the second controllable switch to output the first execution signal to the first actuator when the first switcher fails.

9. The redundant electronic control system of claim 8, wherein the first controller is further coupled to the second controllable switch, the second controllable power switch, and the second electronic power converter, and configured to:
  control the second controllable power switch to switch on the transmission path from the second power signal to the second electronic power converter when the second electronic control circuit fails;
  control, based on a fourth execution target of the second switcher, the second electronic power converter to convert the second power signal into the second execution signal; and
  switch on the fourth controllable switch to output the second execution signal to the second actuator.

10. The redundant electronic control system of claim 9, wherein the first controller is further configured to:
  generate the first execution signal and the second execution signal when the second controllable power switch and/or the second electronic power converter fails; and
  control the first switcher to output the second execution signal to the second actuator and output the first execution signal to the first actuator.

11. The redundant electronic control system of claim 10, wherein the second electronic control circuit is further configured to:
  control, based on the first execution target and the fourth execution target, the third electronic power converter to convert the second power signal into a second combined signal, wherein the second combined signal comprises the first execution signal and the second execution signal;
  switch on the fourth controllable switch to output the second execution signal to the second actuator; and
  switch on the second controllable switch to output the first execution signal to the first actuator.

12. The redundant electronic control system of claim 11, wherein the second controller further comprises:
  a fourth controllable power switch configured to receive the second power signal, wherein the fourth power controllable switch comprises a tenth relay, a tenth MOSFET, or a tenth IGBT; and
  a fourth electronic power converter coupled to the fourth power controllable switch and the second switcher, and configured to convert the second power signal into the first execution signal, and
  wherein the second electronic control circuit is further configured to:
    control the fourth power controllable switch to switch on the transmission path from the second power signal to the fourth electronic power converter when the first switcher fails;
    control, based on the first execution target, the fourth electronic power converter to convert the second power signal into the first execution signal; and
    switch on the second controllable switch to output the first execution signal to the first actuator.

13. The redundant electronic control system of claim 12, wherein the second controllable switch is coupled to the first switcher, and wherein the second controllable switch is further configured to switch off in response to the first execution signal.

14. The redundant electronic control system of claim 13, wherein the first actuator is configured to output first energy to an output target based on the first execution signal, and wherein the second actuator is configured to output second energy to the output target based on the second execution signal.

15. The redundant electronic control system of claim 1, wherein the first controller is further configured to control the second switcher to output the second execution signal to the second actuator when the second controller fails.

16. The redundant electronic control system of claim 1, wherein the second controller is further configured to control the first switcher to output the first execution signal to the first actuator when the first controller fails.

17. The redundant electronic control system of claim 1, wherein the redundant electronic control system is applied to an autonomous vehicle.

18. The redundant electronic control system of claim 1, wherein the redundant electronic control system is applied to a flight vehicle.

19. The redundant electronic control system of claim 1, wherein the redundant electronic control system is applied to an artificial heart.

20. The redundant electronic control system of claim 1, wherein the redundant electronic control system is applied to a heart pacemaker.

* * * * *

UNITED STATES PATENT AND TRADEMARK OFFICE
CERTIFICATE OF CORRECTION

PATENT NO. : 12,195,017 B2
APPLICATION NO. : 17/990003
DATED : January 14, 2025
INVENTOR(S) : Xuefeng Chen, Xin Huang and Zhimin Zhang It is certified that error appears in the above-identified patent and that said Letters Patent is hereby corrected as shown below:

In the Claims

Claim 5, Column 32, Lines 52-53: "and third fourth execution target" should read "and fourth execution target"

Signed and Sealed this
Fourth Day of March, 2025

Coke Morgan Stewart
*Acting Director of the United States Patent and Trademark Office*